(12) United States Patent
Mundt et al.

(10) Patent No.: US 11,807,152 B2
(45) Date of Patent: Nov. 7, 2023

(54) CAMPER SYSTEMS AND VEHICLES HAVING A TRANSLOCATABLE WORK AREA

(71) Applicant: SylvanSport, LLC, Brevard, NC (US)

(72) Inventors: Gregory Kyle Mundt, Asheville, NC (US); Thomas Dempsey, Cedar Mountain, NC (US); Thomas Reeder, Fletcher, NC (US)

(73) Assignee: SylvanSport, LLC, Brevard, NC (US)

( * ) Notice: Subject to any disclaimer, the term of this patent is extended or adjusted under 35 U.S.C. 154(b) by 0 days.

(21) Appl. No.: 17/730,354

(22) Filed: Apr. 27, 2022

(65) Prior Publication Data

US 2022/0250531 A1    Aug. 11, 2022

Related U.S. Application Data

(63) Continuation of application No. 16/808,772, filed on Mar. 4, 2020, now Pat. No. 11,345,271.

(60) Provisional application No. 62/813,471, filed on Mar. 4, 2019.

(51) Int. Cl.
*B60P 3/39* (2006.01)
*B60P 3/34* (2006.01)
*B60P 1/64* (2006.01)

(52) U.S. Cl.
CPC ............... *B60P 3/39* (2013.01); *B60P 3/34* (2013.01); *B60P 1/6409* (2013.01)

(58) Field of Classification Search
CPC ..................................... B60P 3/39; B60P 3/34

USPC .......................... 296/165, 171, 172, 175, 176
See application file for complete search history.

(56) References Cited

U.S. PATENT DOCUMENTS

| | | | | |
|---|---|---|---|---|
| 3,544,152 | A * | 12/1970 | Low .......................... | B60P 3/36 296/168 |
| 4,784,429 | A * | 11/1988 | Hodges .................... | B60J 7/041 296/26.05 |
| 5,029,935 | A * | 7/1991 | Dufrancatel .............. | B60P 3/36 296/156 |
| 5,203,603 | A * | 4/1993 | Hertzberg ................ | B60J 7/041 296/100.03 |
| 6,098,346 | A * | 8/2000 | Miller ...................... | B60P 3/36 296/22 |
| 6,623,058 | B1 * | 9/2003 | Crean ....................... | B60P 3/34 296/165 |

(Continued)

*Primary Examiner* — Joseph D. Pape
(74) *Attorney, Agent, or Firm* — Williams Mullen; E. Michael Saj

(57) ABSTRACT

A work area is provided and includes a substantially horizontal work surface that can be translocated between a first location and a second location. The work area includes one or more tracks along which the work area can be moved between a first and a second location and the work surface remains slidably connected and substantially horizontal during translocation between a first location and second location. The first location may include a floor above which the work surface is situated when the work area is located in the first location and the second location may include a base above which the work surface is situated when it is in the second location. The floor and the base are not level with each other and when the work surface is located in the first location, its height above the floor is substantially the same as its height above the base when it is in the second location.

13 Claims, 27 Drawing Sheets

(56) References Cited

U.S. PATENT DOCUMENTS

| | | | | |
|---|---|---|---|---|
| 6,735,909 B1* | 5/2004 | Gardner | ............ | E04B 1/3431 |
| | | | | 52/656.1 |
| 6,851,734 B2* | 2/2005 | Findley | ............ | B62D 61/12 |
| | | | | 296/171 |
| 7,111,884 B2* | 9/2006 | Johnson | ............ | B60R 11/06 |
| | | | | 296/26.1 |
| 9,597,993 B2* | 3/2017 | Pellicer | ............ | B62D 63/061 |
| 10,710,491 B1* | 7/2020 | Groover | ............ | B60P 3/34 |

* cited by examiner

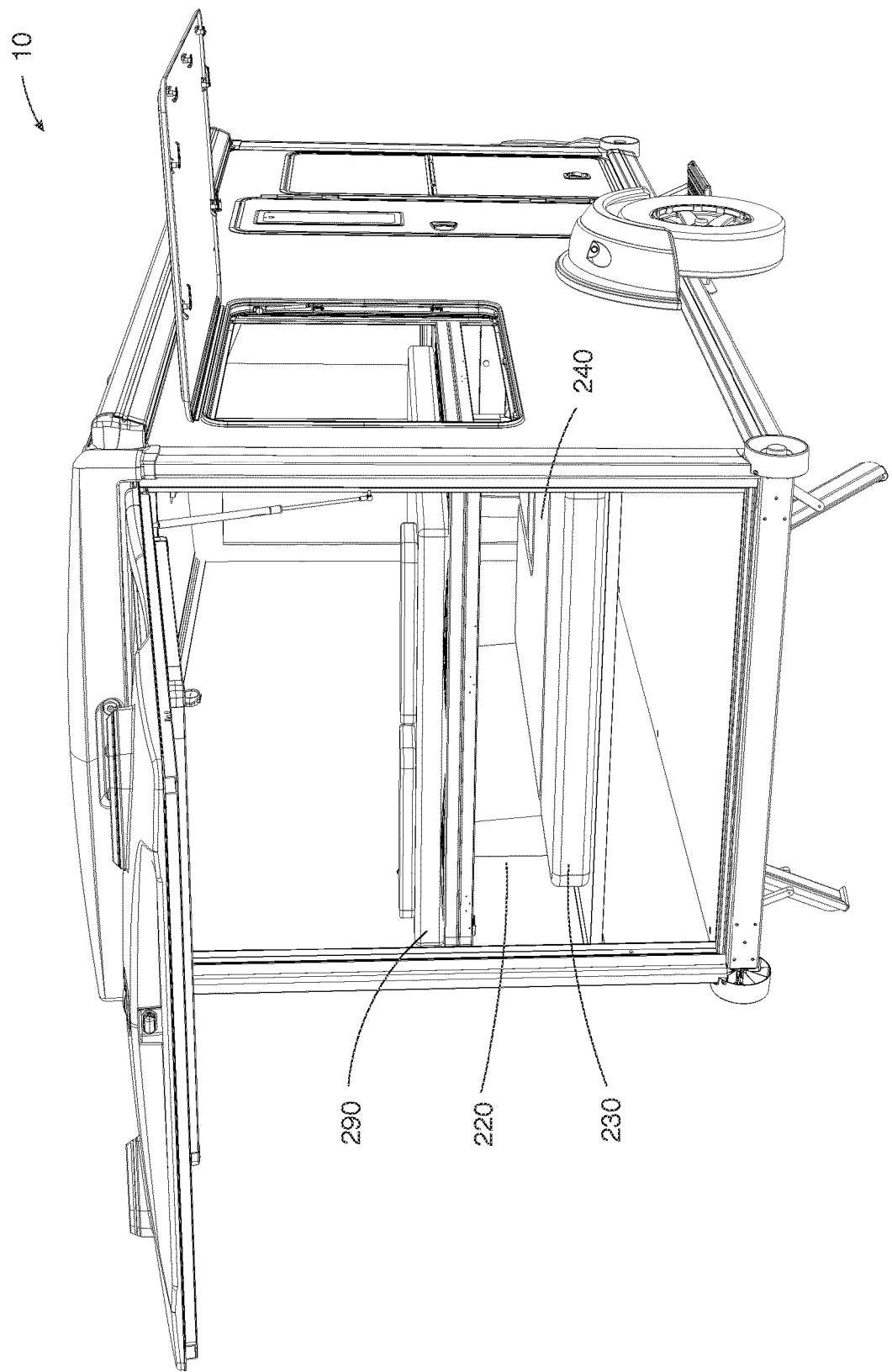

CAMPER SYSTEMS AND VEHICLES HAVING A TRANSLOCATABLE WORK AREA

RELATED APPLICATIONS

The following application claims priority to U.S. Provisional No. 62/813,471 filed Mar. 4, 2019, and allowed U.S. application Ser. No. 16/808,772 filed Mar. 4, 2020, the disclosures of which are incorporated by reference in its entirety.

FIELD OF THE DISCLOSURE

This disclosure relates generally to the field of motor vehicles and portable units, particularly motorized vehicles and non-motorized vehicles (e.g., trailers) used for camping and recreation. In an embodiment, this disclosure relates to a camper system having work area that functions as a kitchen that is slidably mounted to be located and used either within or on the exterior of the camper. In another embodiment, it relates to camper system having an adjustable lounge and a slidable work area that functions as a kitchen.

SUMMARY

The following presents an overview of certain aspects of the disclosure. This summary is not an extensive overview of the disclosure. It is not intended to identify critical elements of the disclosure, or to delineate the scope of the disclosure. Its sole purpose is to present some concepts of the disclosure in as a prelude to the more detailed description that follows.

One aspect of lateral sides of the disclosure is directed to a kitchen system for a camper. In one embodiment, the kitchen system may be comprised of a frame having a front panel, a rear panel, and a back panel and a substantially horizontal counter extending perpendicularly from the front panel and rear panel. The frame may be configured to move between an indoor position and an outdoor position. For example, one, two, or more guide rails and slides slidably connected to one another may be coupled to the frame in order to facilitate the transition of the kitchen system from the indoor position to the outdoor position. The kitchen system slidably transitions or translocates from the indoor position to the outdoor position laterally outside the camper. The kitchen system may slide downwardly from the indoor position to the outdoor position at an angle between about 15 to 45 degrees. The counter in the outdoor position may be configured to be at a height suitable for cooking if the camper is parked on a substantially flat surface (e.g., level ground or pavement).

Another aspect is directed to a work area comprising a substantially horizontal work surface (e.g., counter) that transitions or translocates between a first location and a second location. The work area may comprise one or two or more rails or tracks (e.g., guide rails and slides slidably connected to one another) along which the work area can be moved between a first and a second location. The first location may comprise a floor above which the work surface is situated when the work area is located in the first location, and the second location may comprise a base above which the work surface is situated when it is in the second location. When the work surface is located in the first location, its height above the floor may be substantially the same as its height above the base when it is in the second location (assuming the base and floor are substantially level).

BRIEF DESCRIPTION OF THE DRAWINGS

FIGS. 9A-9B show the lounge system and the camper in various arrangements.

DESCRIPTION

1. Definitions

Figure 1A:
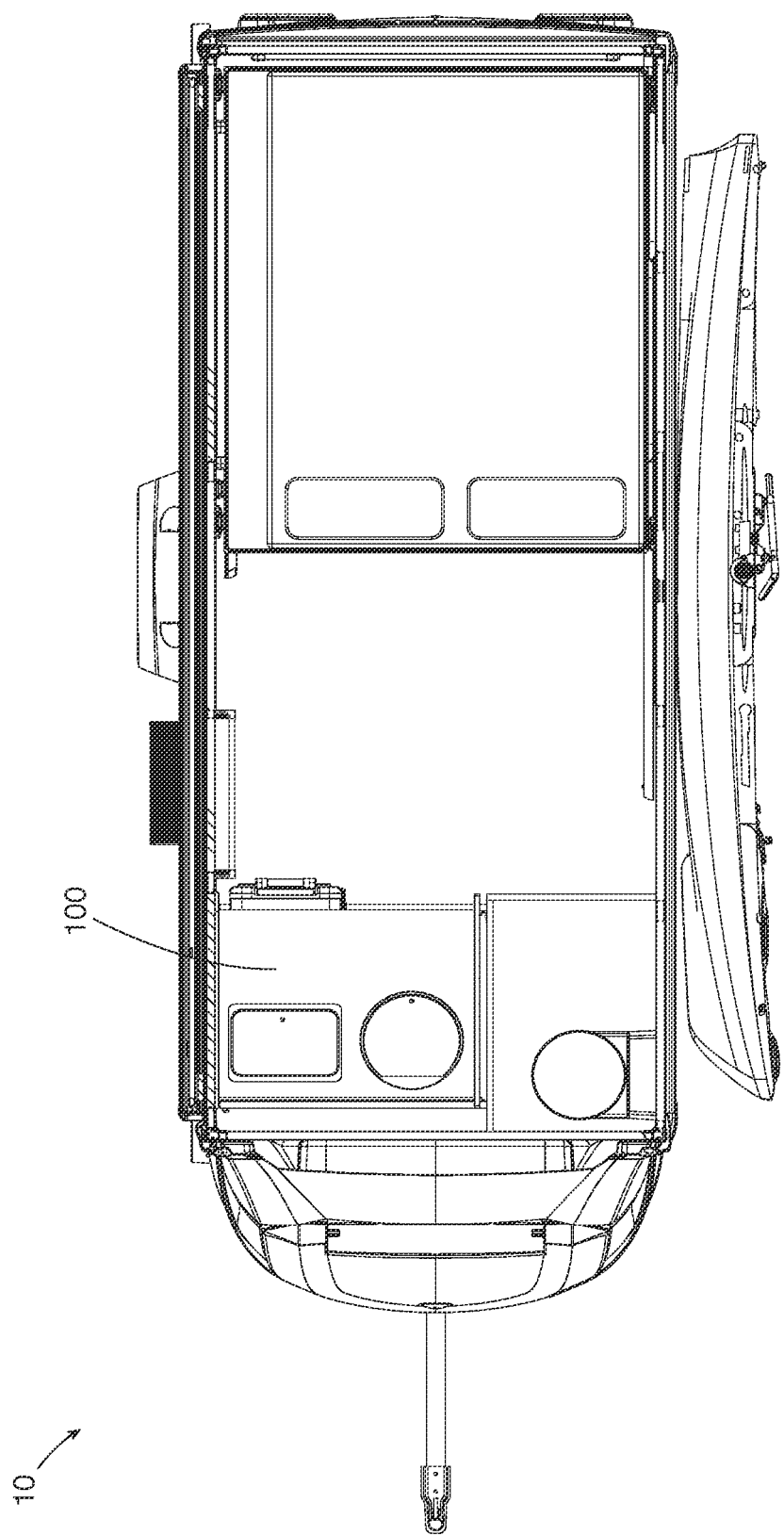
FIGS. 1A-1C show top views and perspective views of a camper system having a kitchen system and an adjustable lounge system in multiple configurations.

As used herein class A motorhomes are motorhomes built using either commercial bus or truck chassis, as well as specialized motor home chassis.

As used herein class B motorhomes, also known as camper vans, are motorhomes built on a box van frame or chassis.

As used herein a class C motorhome are a hybrid between the Class A and Class B motor home built with a cabin chassis and an "over-cab" sleeping area.

As used herein a truck camper is a recreational vehicle that is mounted in the back of a pickup truck.

As used herein trailer is an unmotorized vehicle that can be towed by a motor vehicle, and a camping trailer is a trailer with facilities for people to use for sleeping and cooking. Fifth wheel trailer and camping trailers (fifth wheel campers) are trailers and camping trailers that require the towing coupling to be installed in the bed of a pickup truck that acts as the towing vehicle.

As used herein a camper is understood to be a vehicle (motorized or unmotorized) with facilities for people to use for sleeping and cooking including, for example, motorhomes, truck campers, and camping trailers.

Lightweight materials as used herein means materials having a weight that enable the frame to be positioned within or on the exterior of the camper, and in some examples, may include high strength to weight ratio materials.

As used herein, substantially the same height means a height within the range of or that is suitable for performing the same function (e.g., cooking) when the work surface is translocated and is in the first location (interior or retracted position) and is in the second location (exterior or deployed position).

2. Detailed Description

The present disclosure describes innovative systems that can be used to transport and translocate work areas comprising a substantially horizontal work surface between two locations, a first location and a second location. When installed in a motor vehicle (e.g., a van or box truck) or portable unit (transportable units such as those built in intermodal transport containers), the first location or "retracted position" (sometimes termed the "indoor position") may be within or substantially within the motor vehicle or portable unit and the second location or "deployed position" (sometimes termed the "outdoor position") may be exterior or substantially exterior to the motor vehicle or portable unit. The innovative system may be utilized with a variety of work spaces use for vehicle or portable unit-based stores, vending operations, banks, cafés, restaurants, medical facilities, dental facilities, veterinary facilities, pet grooming facilities, food preparation facilities, or locksmithing facilities.

In some embodiments, the work area functions as a kitchen that may be installed in a reactional vehicle such as a motorized recreational vehicle (e.g., camper vans, Class A, B, or C-motor homes,) or a portable unit used as campers (e.g., truck campers, tow behind campers, or trailers, fifth wheel campers), which is exemplified in some detail herein. In such installations when the kitchen is in the first location it is substantially or fully within the reactional vehicle (indoor position) or portable unit where it functions as an operational kitchen; and when the kitchen it is in the second location it is substantially or fully on the exterior of the reactional vehicle or portable unit (exterior position) where it also functions as an operational kitchen.

The work areas, and their installation and use in motor vehicles and portable units such as campers are described more fully with reference to the accompanying drawings, in which certain embodiments are shown. However, this innovative concept should not be construed as limited to the embodiments set forth herein. Rather, these embodiments are provided so that this disclosure will be thorough and complete, and will fully convey the scope of the invention to those skilled in the art.

Well-known functions or constructions may not be described in detail for brevity and/or clarity. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The present disclosure relates to a camper system 10. The camper system 10 further has a kitchen system 100 and an adjustable lounge system 200. The kitchen system 100 includes a frame 110, a movement mechanism 112 for moving the frame 110, and accordingly the whole kitchen system, from an indoor position to an outdoor position, and a counter 150. The adjustable lounge system 200 includes a lounge 220 and a table 280.

Figure 1B:
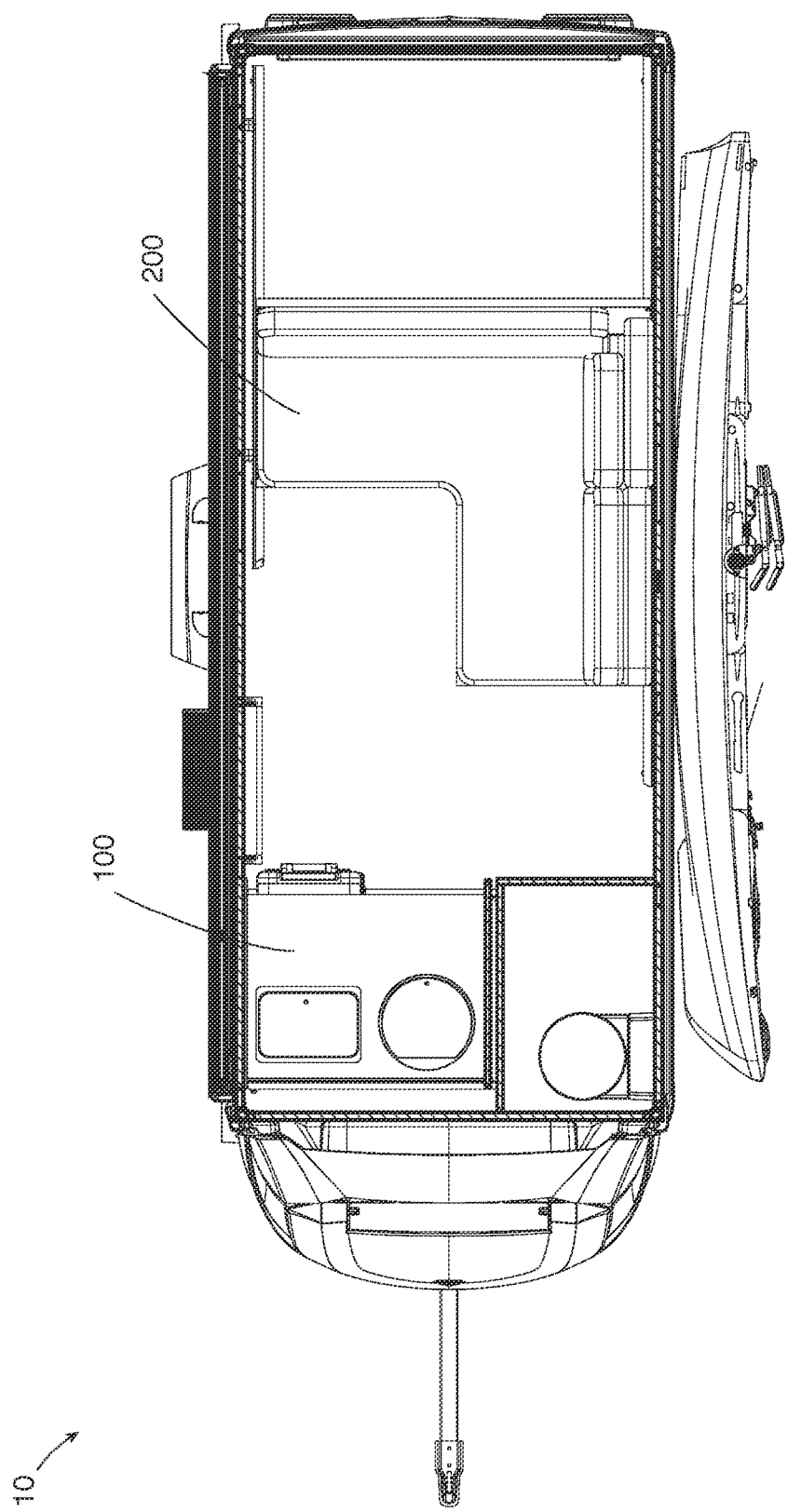
Figure 1C:
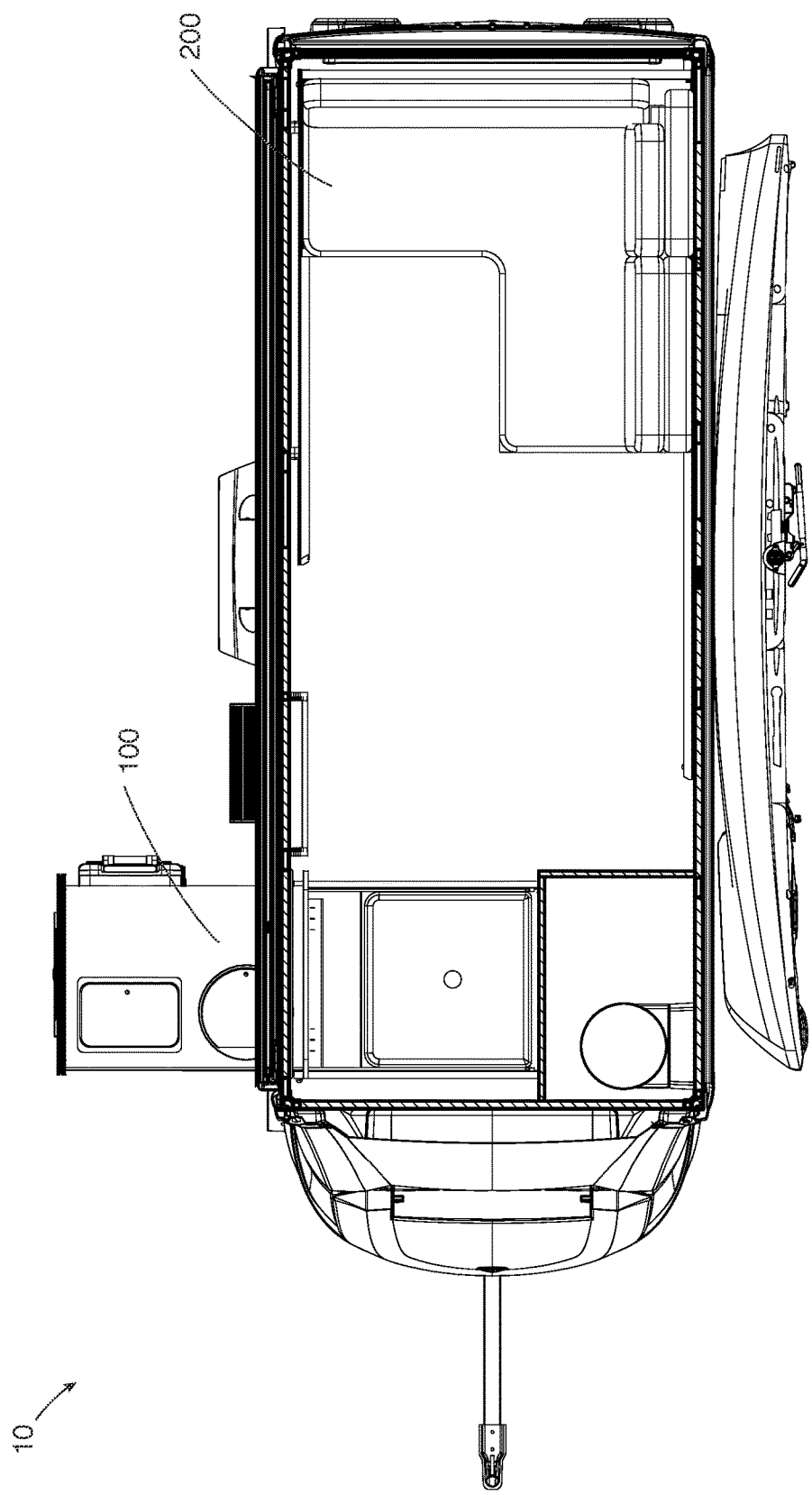

As can be seen in the embodiments shown in FIGS. 1A-1C, the camper system 10, which is of the camping trailer type, may comprise a kitchen system 100 and a lounge system 200 contained wholly within a camper such that the kitchen system 100 and lounge system 200 may be transported with the camper. The lounge system 200 may be proximate a rear of the camper system 10, and the kitchen system 100 may be proximate a front of the camper system 10. In an embodiment, the camper 10 may have a length between 18 and 25 feet, a width between 7 and 10 feet, and a height between 8 and 12 feet.

FIGS. 2A-2E show the kitchen system 100 as it moves (transitions or translocates) between an indoor position and an outdoor position. The frame 110 is configured to be moved in connection with the moving mechanism 112. In some embodiments, the moving mechanism 112 is a guide rail and slide such that the kitchen system 100 can slide from an indoor position to an outdoor position, and from an outdoor position to an indoor position.

In addition to the moving mechanism 112, the kitchen system 100 may include one or more additional mechanisms to assist in smoothly transitioning the kitchen system 100 from an indoor position to an outdoor. The additional mechanisms may assist to reduce the force required to move the kitchen system between positions, and may work in tandem with the moving mechanism 112. The additional mechanisms may be desirable as they may assist in smoothly transitioning the kitchen system 100 without the requirement for excess force from a user. In some embodiments, the additional mechanisms may include a constant force spring that fully or partially supports the load when the kitchen system 100 is deployed. This allows a user to deploy the kitchen system 100 without otherwise bracing the kitchen system to prevent it from descending to its extended position in an uncontrolled dangerous manner. There may be additional springs and/or other mechanisms that support the load when the kitchen is transitioned between an outdoor position to an indoor position. In some embodiments, the deployment and retraction of the kitchen system may be mechanized, thus eliminating the need for use of force from a user.

The kitchen system 100 is useable in both the indoor position and the outdoor position. Put another way, the kitchen system 100 is fully functional when it is deployed as well as when it is retracted. Thus, the kitchen system 100 is useable at two extreme positions. This may provide users with many advantages over the prior art. For example, if a user encounters inclement weather, it is not necessary for the user to deploy the kitchen system 100 to an outside position in order to prepare a meal or otherwise utilize the kitchen system 100. Additionally, now users who wish to have both an indoor kitchen and an outdoor kitchen no longer need to outfit a camper with duplicate kitchen systems and kitchen appliances, or settle for a less functional kitchen system to be used outdoors. It is important to users to make the most of the space in a camper, and the adjustable kitchen system 100 allows users to have an outdoor kitchen and an indoor kitchen without taking up excess space or duplicating any appliances.

In some embodiments, the kitchen system 100 may further have a means of locking or retaining the frame 110, and accordingly the kitchen system, in the indoor or outdoor position. For example, the compact kitchen 120 may be locked into position using detents, pins, bolts, or any other appropriate locking mechanism in the art now known or later developed.

The frame 110 may be constructed from any appropriate material. In some embodiments, the frame 110 is constructed from lightweight materials, such as lightweight metals (e.g., aluminum, aluminum alloys, magnesium, magnesium alloys, titanium and titanium alloys) and light weight polymers, plastics and/or composites (e.g., fiber reinforced polymer composites such as polyurethane foam reinforced with layers of fiberglass). Alternatively, the frame may be metal, steel, wood, or any other appropriate material now known or later discovered. The frame 110 consists of a front panel 120 having an outer surface 122 and an inner surface 124. A rear panel 130 is parallel to the front panel, and may be substantially similar in width and length to a width and length of the front panel 120. The back panel 130 also has an outer surface 132 and an inner surface 134 that faces the front panel 120. A back panel 140 is perpendicular to the front and rear panels 120, 130, and is coupled to the rear panel 130 at a back edge of the rear panel 130. The rear panel may have a substantially similar shape to a parallelogram. In some embodiments, the back panel 140 is also coupled to the front panel 120 at a back edge of the front panel 120.

When the kitchen system 100 is in an indoor position, the outer surface of the front panel 122 may be part of an outer surface of the camper 10. Further, when the kitchen system 100 is in an outdoor position, the outer surface of the rear panel may also be a surface of the shower. Thus, the fitting between the camper 10 and the outer surface of the rear panel 132 and the fitting between the camper 10 and the outer surface of the front panel 122 are preferably water tight.

In some embodiments, when the kitchen system 100 is deployed in its outdoor position the lower most point of the front panel 122, may be lower than a bottom of the camper, and may even contact the base (e.g., ground, pavement etc.) on which the camper is located. In an embodiment, the front panel or another portion of the frame 110 may be outfitted with a bumper (e.g., a rubber bumper), wheel(s) and/or leg(s) that can contact the ground preventing damage to the front panel and stabilizing the deployed kitchen system.

Although shown with the kitchen deploying perpendicular to the direction of travel (on a lateral side) in FIGS. 2A-2E, in other embodiments, the kitchen may be situated such that it can be deployed from the rear or front of the camper system so that it can be deployed parallel to the direction of travel (e.g., out the rear of the camper).

Figure 2A:
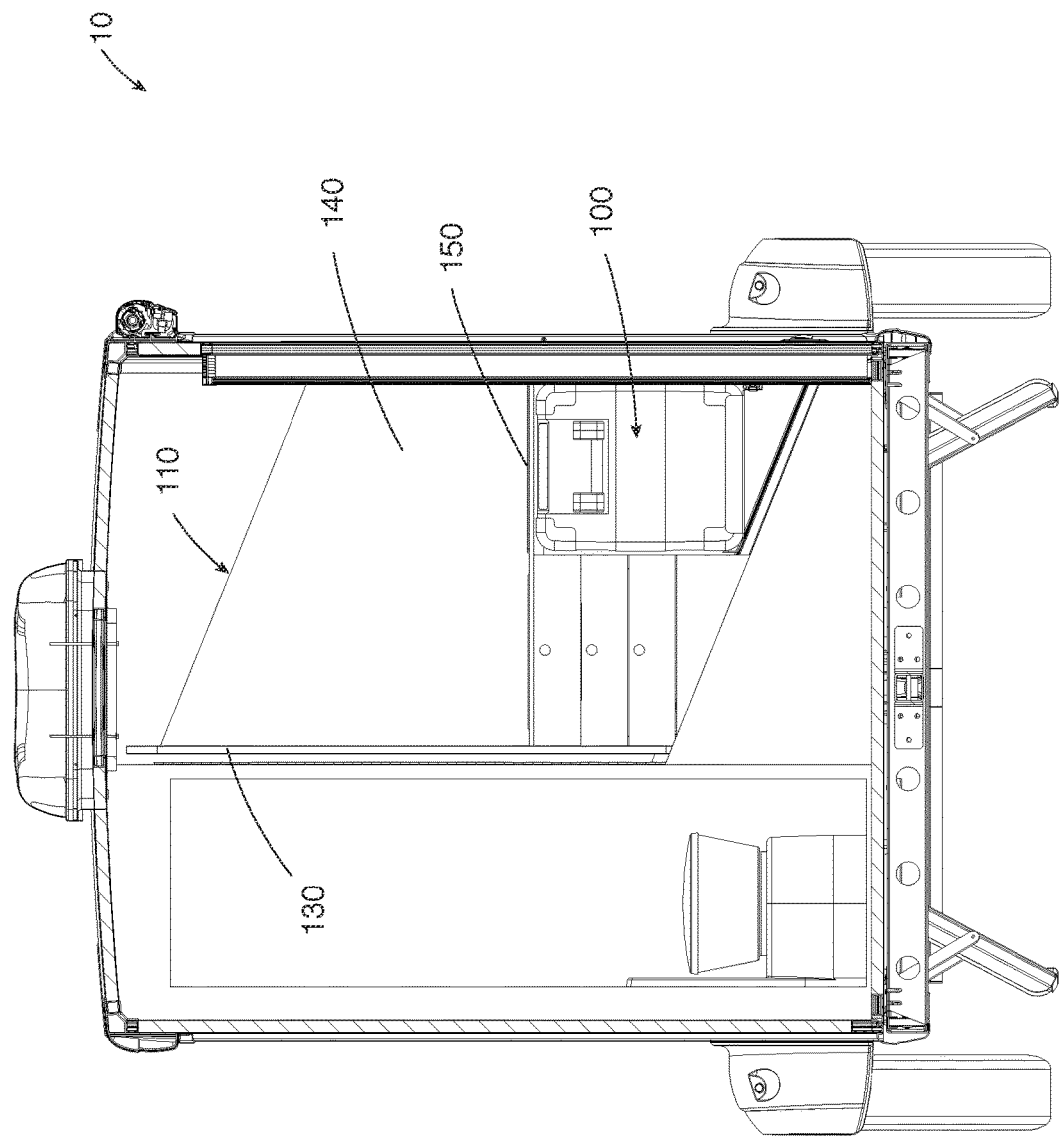
FIGS. 2A-2E show back views and perspective views of an embodiment of a compact kitchen of a kitchen system as it transitions between an indoor position and an outdoor position.
Figure 2B:
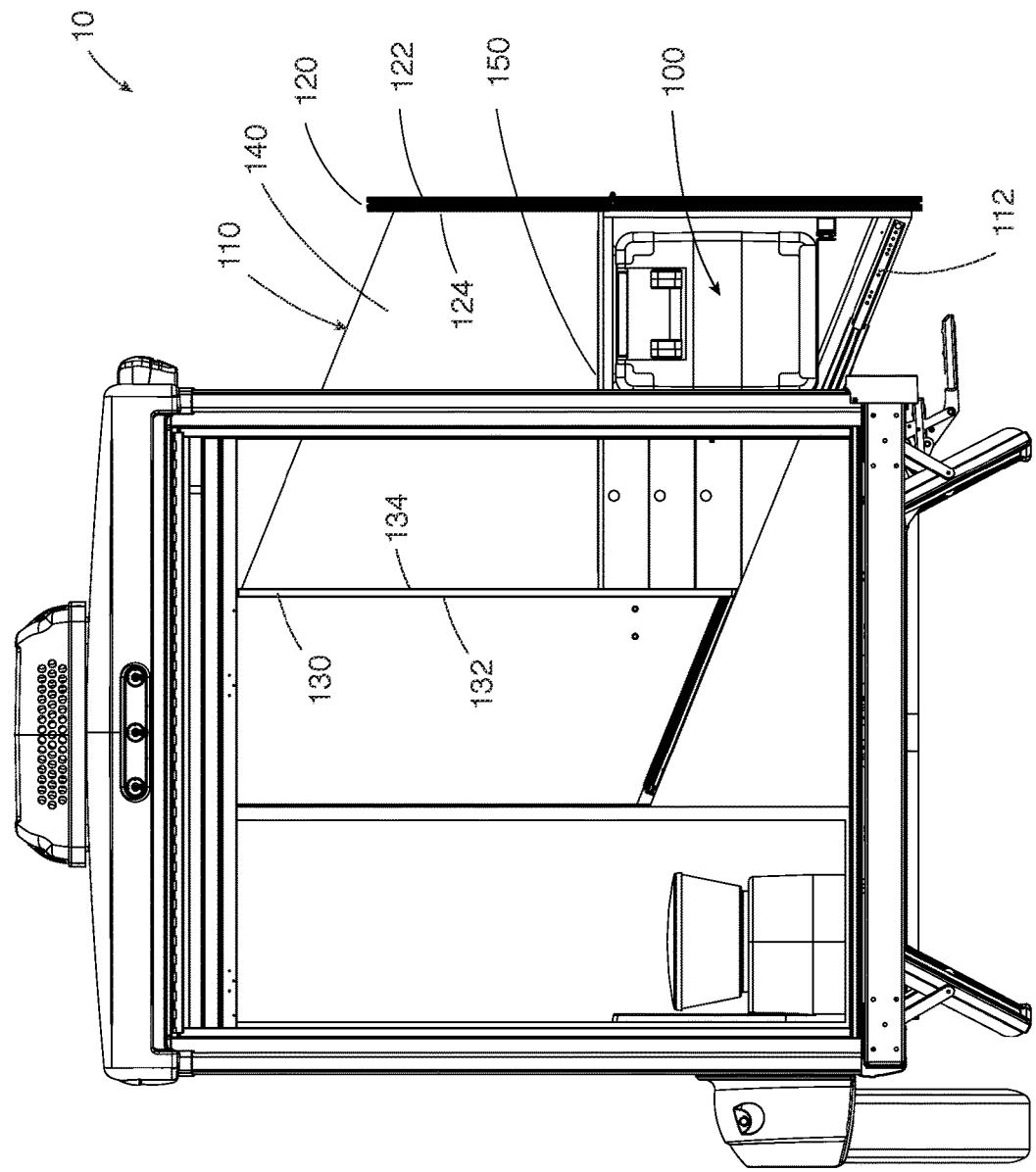
Figure 2C:
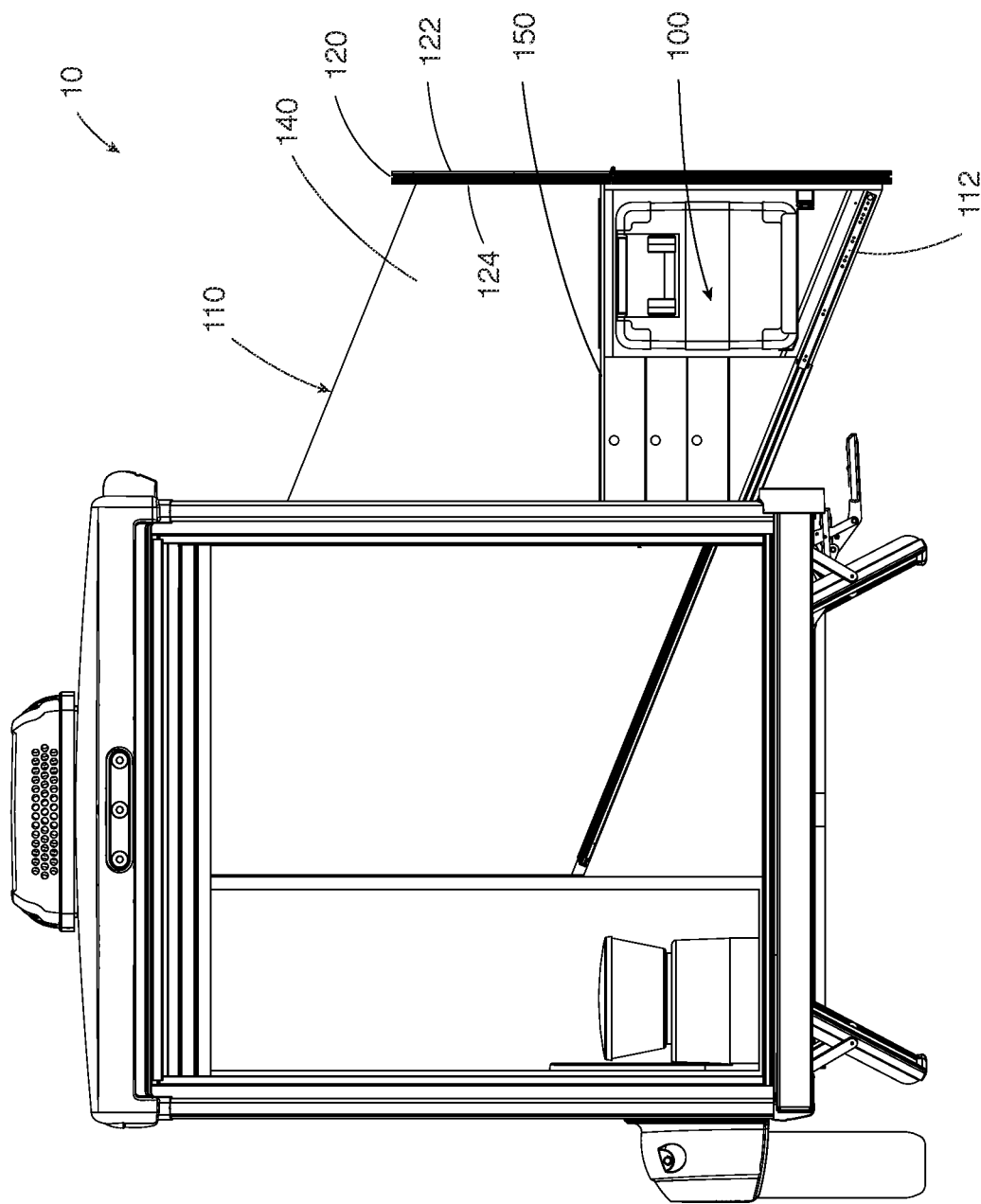
Figure 2D:
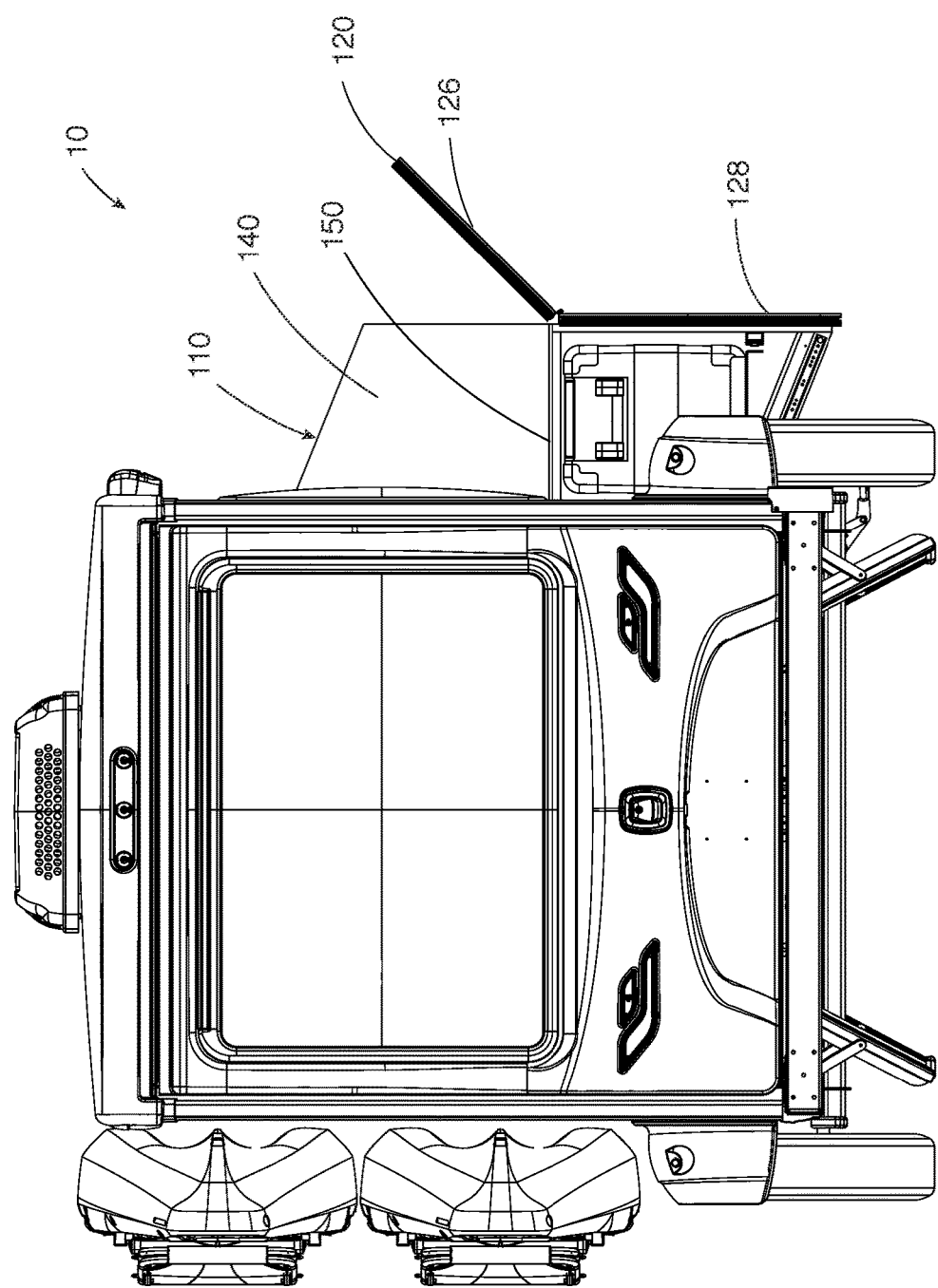
Figure 2E:
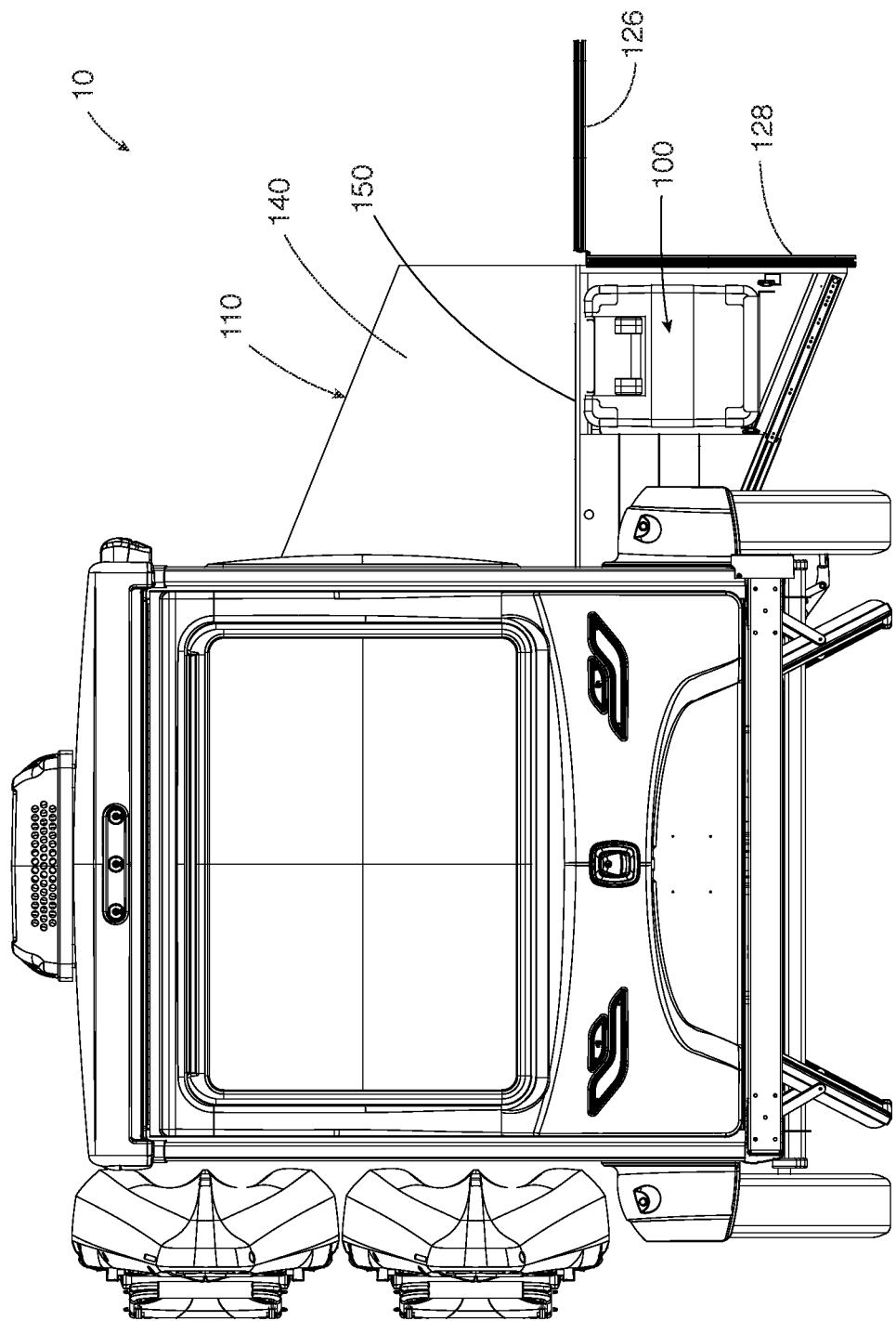

The counter 150 extends in a horizontal plane between the front panel 120 and the rear panel 130. In the indoor position or the retracted position, the counter may be 32-42 inches from a floor of the camper. This allows for a comfortable cooking height for users. When the kitchen system 100 is deployed in the outdoor position, the kitchen system 100 is configured such that if the camper 10 is parked on a flat surface, the counter 150 is also 32-42 inches above the flat outdoor surface. Due to differences in the terrain, it is foreseeable that if the camper were not parked on a flat surface, the height of the counter 150 may be outside the intended 32-42 inch range. In some embodiments, the front panel 120 may have a top portion 126 and a bottom portion 128 that are hingedly connected as best seen in FIGS. 2D and 2E. The top portion 126 may be approximately at the same as the counter 150, and may fold outwardly and downwardly at the same height and angle as the counter 150 to create additional counter space. In this embodiment an inner surface of the top portion 126 of the front panel 120 faces upwardly instead of towards the rear panel 130, and may now be perpendicular to the rear panel 130 and the bottom portion of the front panel 128. The bottom portion 128 may remain fixed and parallel to the rear panel 130.

The kitchen system 100 also has a base panel 160 that may be coupled to a movement mechanism 112. In some embodiments the base panel 160 is coupled to the front panel 120, the rear panel 130, and the back panel 140. The base panel 160 may define a bottom of the kitchen system 100 and may be continuous between the front panel 120 and the rear panel 130.

Figure 3A:
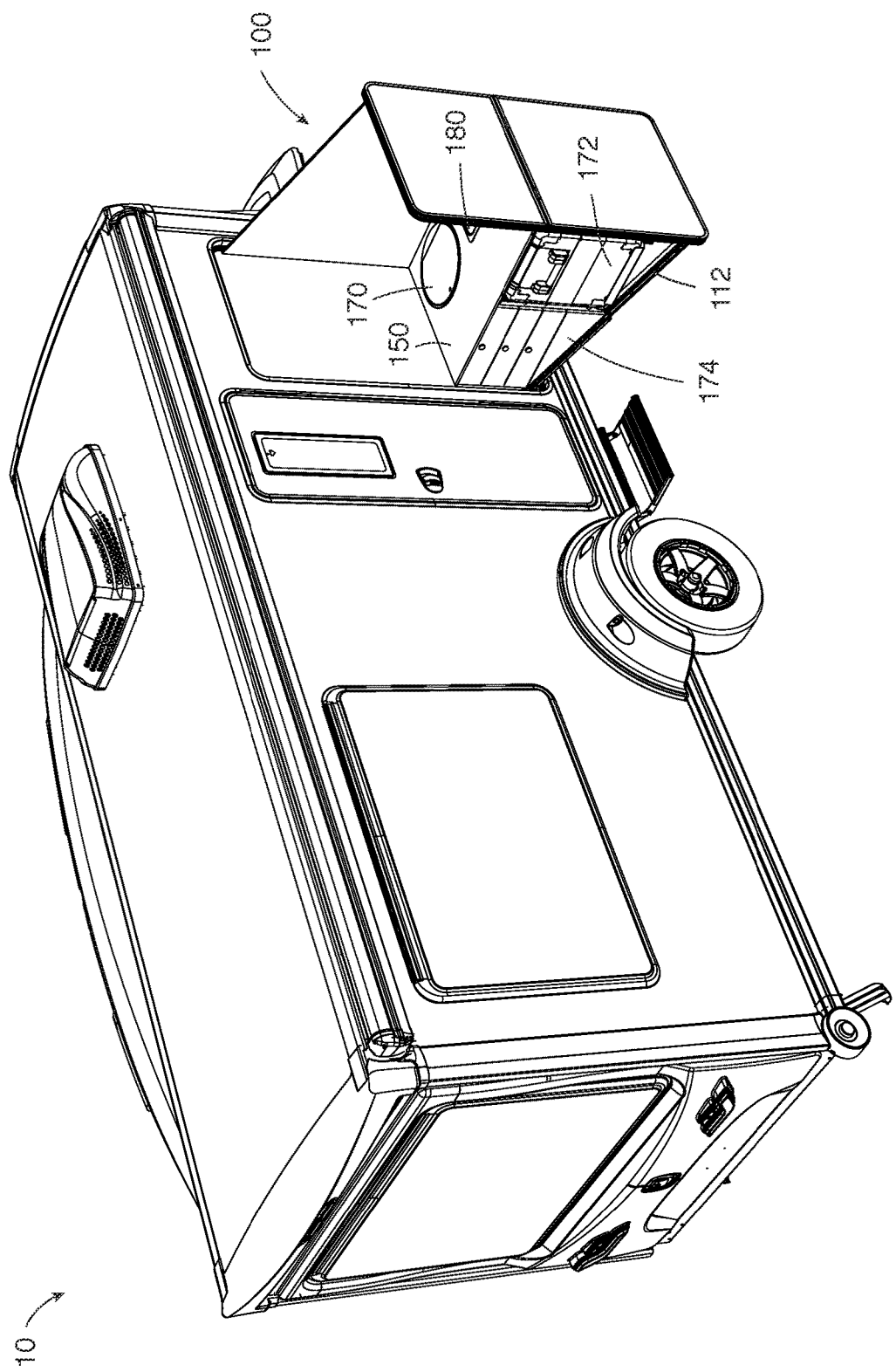
FIGS. 3A-3C show the kitchen system in the inside and outside position.
Figure 3B:
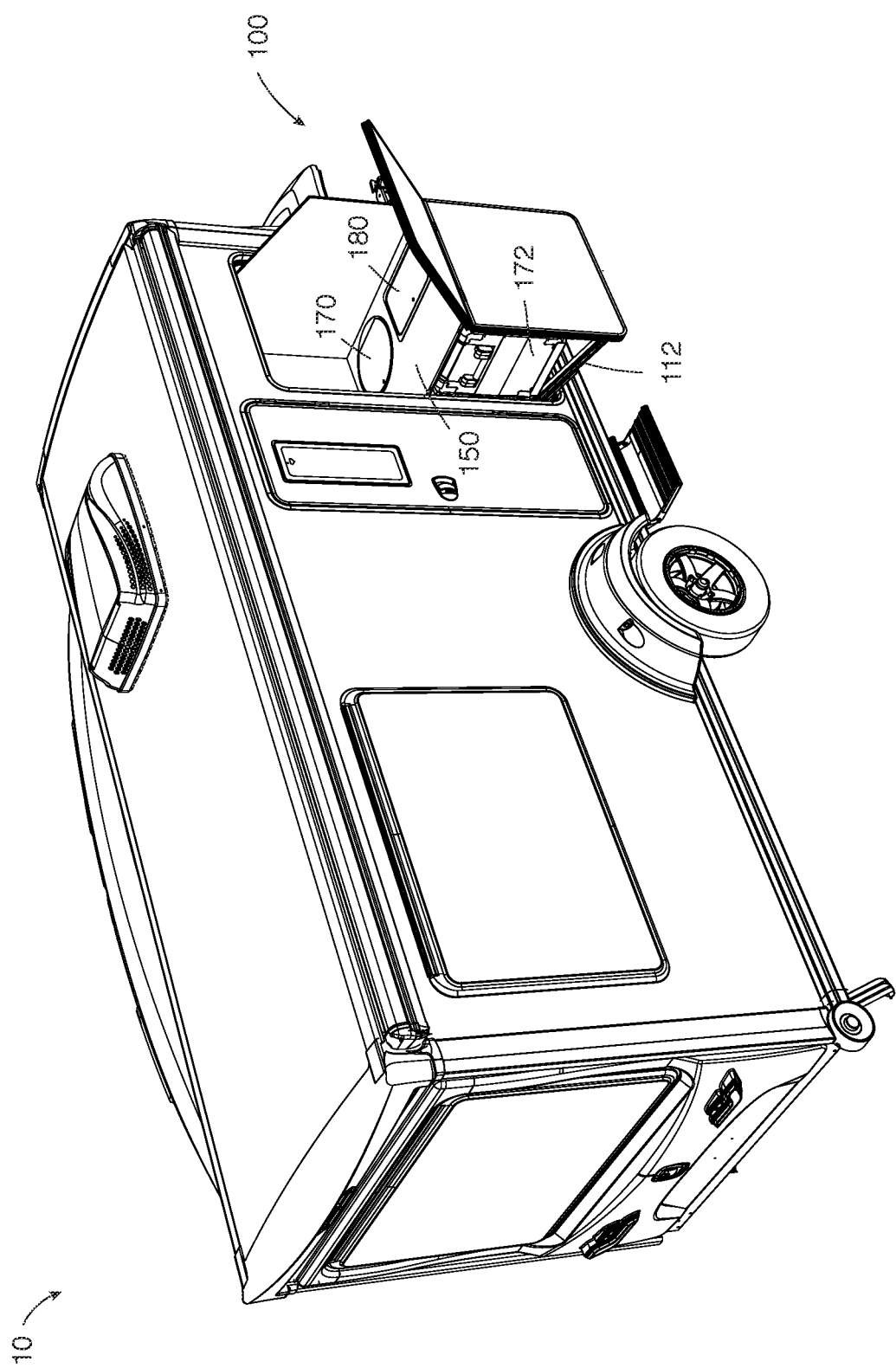
Figure 3C:
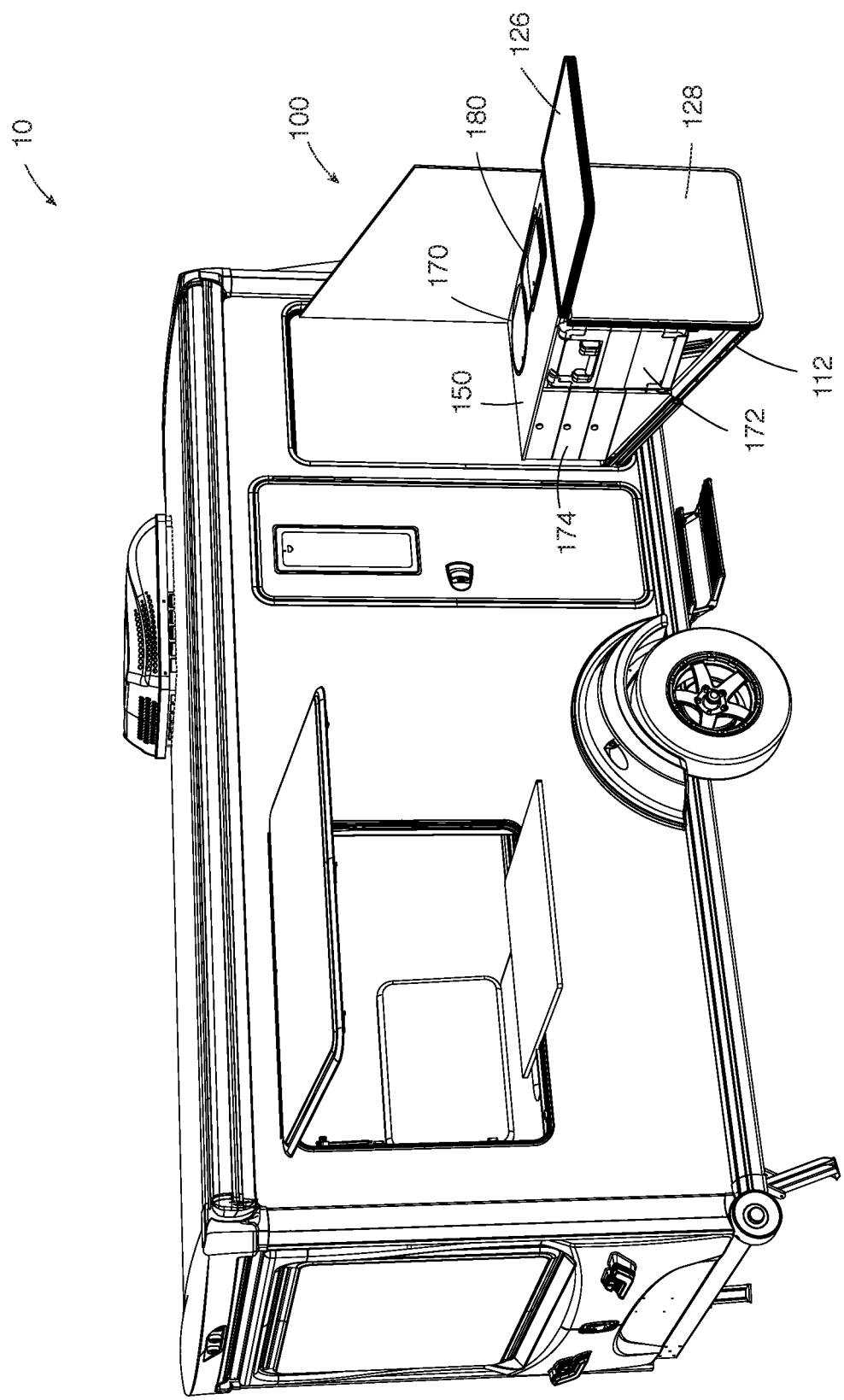

The kitchen system 100 may comprise a sink 170 disposed in the counter, a refrigerator 172, and storage bins 174 as can be seen in FIGS. 3A-3C. In some embodiments, the kitchen system 100 may have a stove 180 (e.g., a two burner gas stove). The storage bins 174 may have sufficient capacity to store all of the necessary kitchenware. This may be helpful in eliminating the need to manually transfer tools required for cooking from inside the camper, and may assist in keeping all the tools required for cooking in a central location. In some embodiments, the kitchen system 100 may only be used in the outside the camper. In other embodiments, the kitchen system 100 may be used both outside the camper and within the camper. The kitchen system 100 may have built-in storage to keep dining equipment safe and secure as it transitions from the indoor position to the outdoor position.

In other embodiments, the kitchen system 100 may further comprise a chopping board, serving bench, lid for the sink, and a cooler. The lid for the sink may be useful in expanding the counterspace area. That is, while the sink 170 is not in use, the lid would cover the sink 170 and thus create additional counterspace. The lid may be composed from appropriate material that is sufficiently sturdy, such as plastic, wood, plastic blends, etc., or any appropriate material in the art now known or later discovered. In some embodiments a sink spout is sunk within a basin of the sink such that the lid could entirely cover the sink spout. In other embodiments, the spout extends above a top edge of the basin, and the lid fits into place around the spout.

Figure 4:
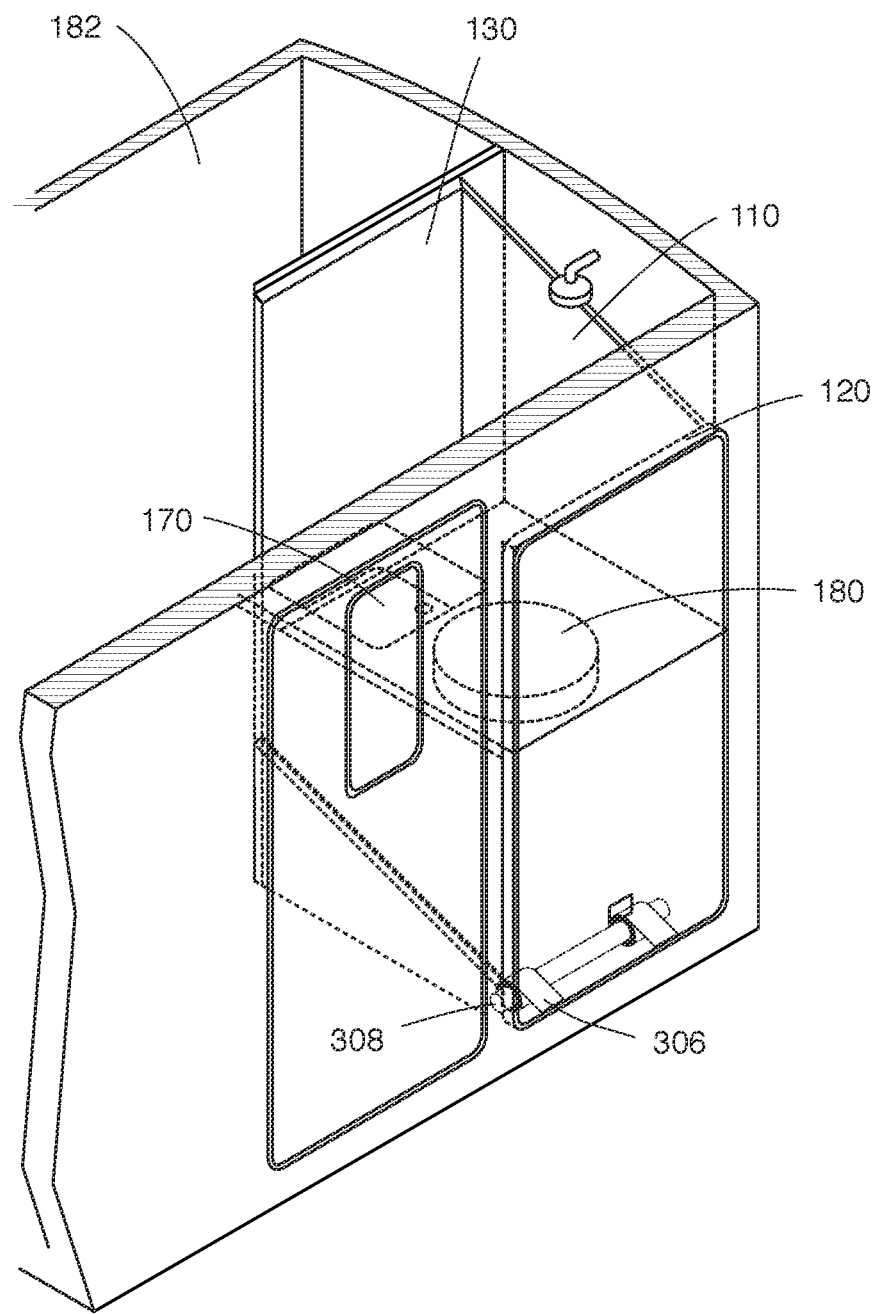
FIG. 4 shows a perspective view of a camper system having a kitchen system in an indoor position adjacent to a bathroom.
Figure 5:
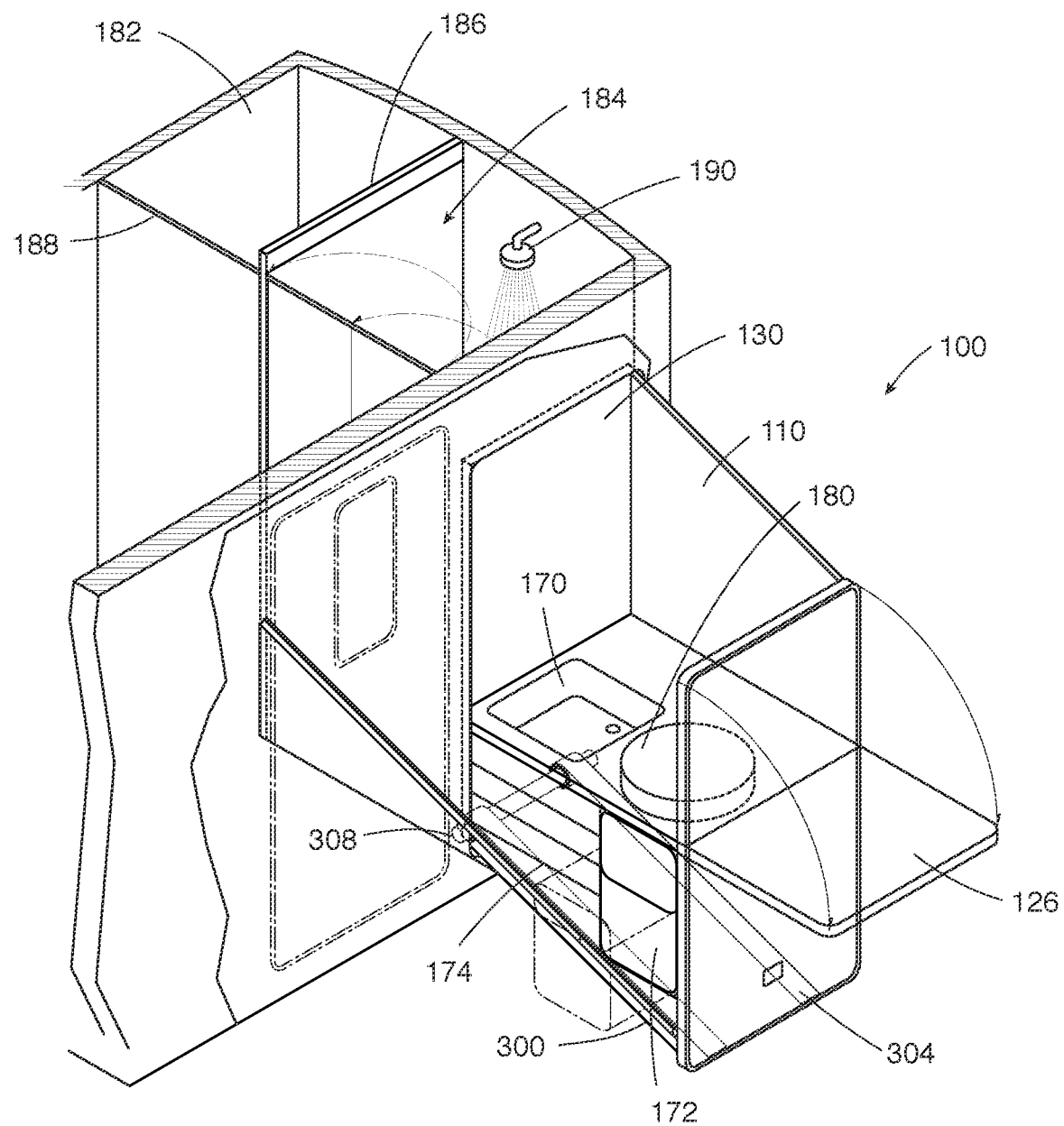
FIG. 5 shows a perspective view of the camper system in FIG. 4 with the kitchen system in an outdoor position to expose a shower area.

In some embodiments, the kitchen system 100 is proximate to the bathroom 182 and may occupy the space utilized as a shower 184 when in an indoor position. In such an embodiment, when the kitchen system 100 is deployed to its exterior position, the shower area 184 of the camper may become available. This can be seen in FIGS. 4 and 5. In FIG. 4, the kitchen system 100 is proximate the bathroom 182 of the camper. FIG. 5 shows the shower space 184 when the kitchen system 100 is deployed in the outdoor position. The bathroom 182 may be separated by the shower area 184 by a shower partition 186. The bathroom may further include a toilet partition 188. The shower area 184 includes a shower head 190.

Alternatively, the kitchen system 100 may be located away from a bathroom 182 and/or shower 184 of the camper 10. Thus, when the kitchen system 100 deploys to an outside position, extra living area may be created within the camper.

The kitchen system 100 may be slidably adjusted from an inside position or retracted within the camper to an outside position laterally outside the camper. The kitchen system 100 may be continuously slidably adjustable downwards so that the counter 150 is at a typical counter height when a user is standing on the ground beside the camper. Alternatively, the counter 150 in the outdoor position is at a height that is suitable for cooking when a user is standing on the ground proximate the camper. In some embodiments, the kitchen system 100 moves downwardly at an angle between about 15 to 45 degrees (e.g., 15 to 25, 20 to 30, 25 to 30, or 35 to 45 degrees) from the horizontal as it transitions from an inside position to an outdoor position, or a deployed position. The work surface (countertop) is substantially horizontal in the indoor and outdoor position, and remains substantially horizontal even during translocation between those positions. Preferably, the kitchen system 100 moves downwardly at an angle between 20 and 30 degrees as it deploys. In some embodiments, the kitchen system 100 slides out between 24 and 60 inches. Preferably, the kitchen system travels 35-50 inches.

Figure 6:
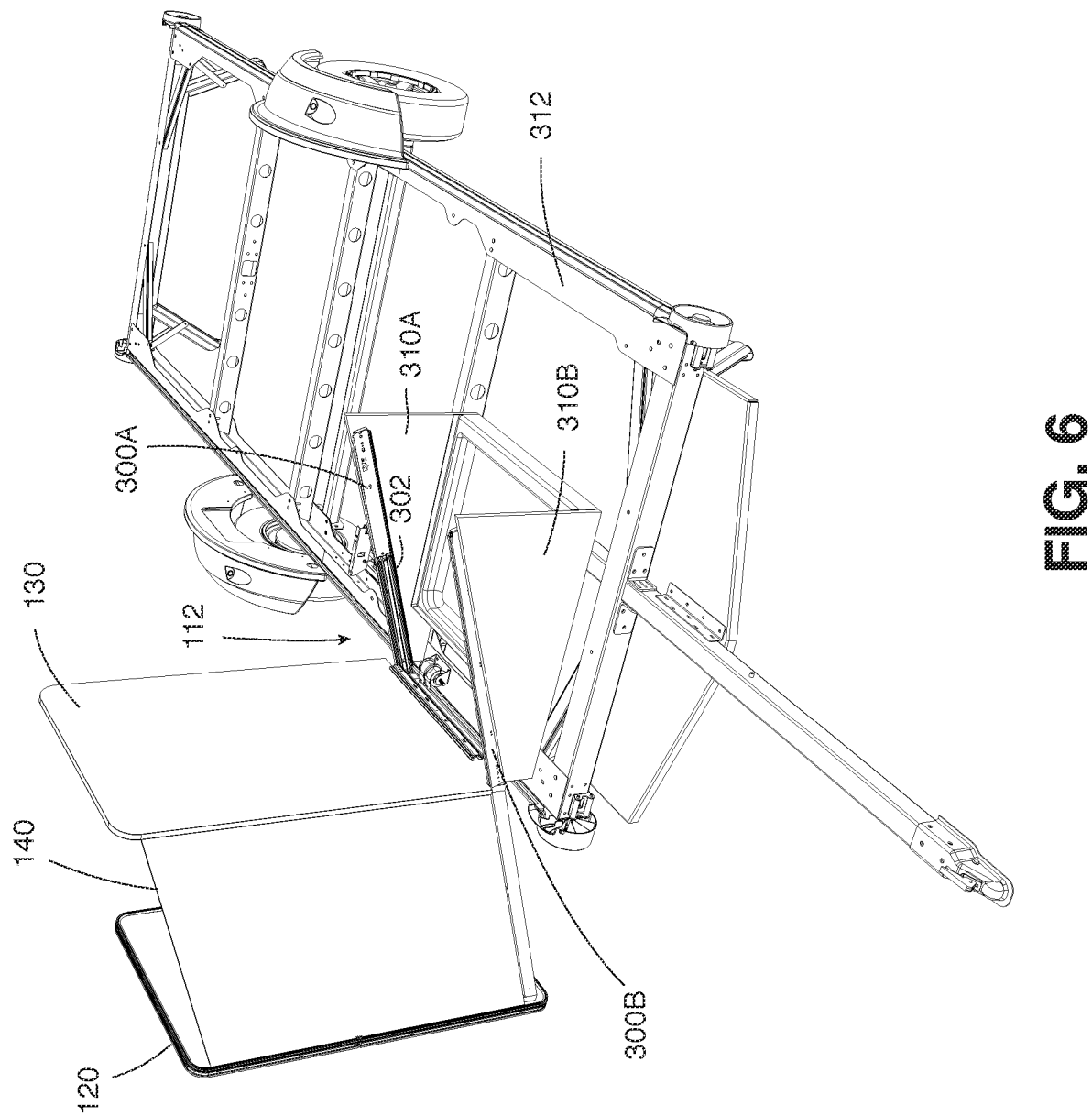
FIG. 6 is a view of a trailer with the walls removed to expose the guide rails (guide and slides) and associated structure for moving the work area (e.g., kitchen system) between its interior and exterior locations.
Figure 7A:
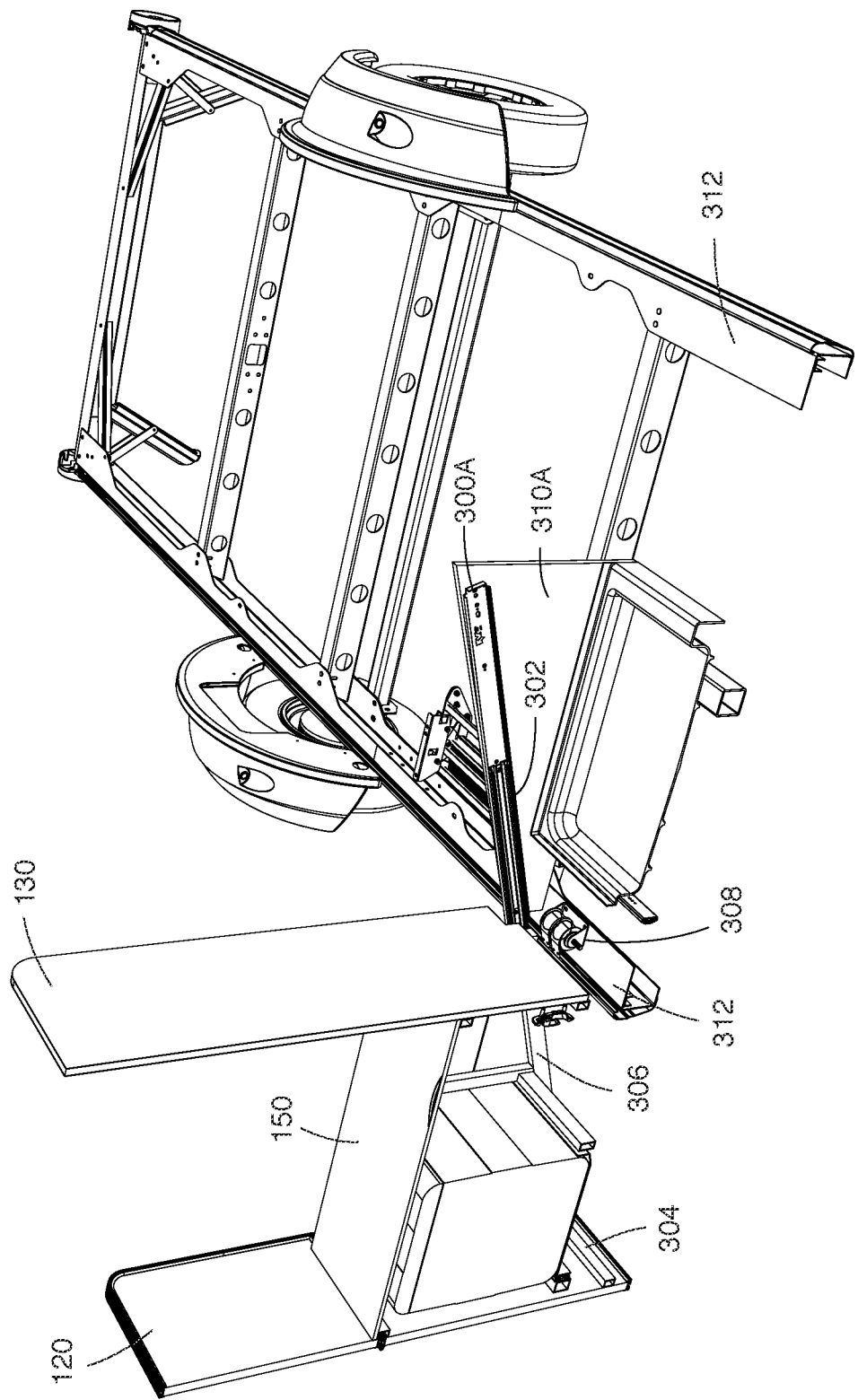
FIGS. 7A and 7B show two sectional views of the trailer shown in FIG. 4 with the work area (in this case the kitchen system of a camper) in the "deployed" exterior location. The section is through the work area (e.g., kitchen system) showing details of a guide rail and slide used to support the work area along with the tension springs used to balance the load.
Figure 7B:
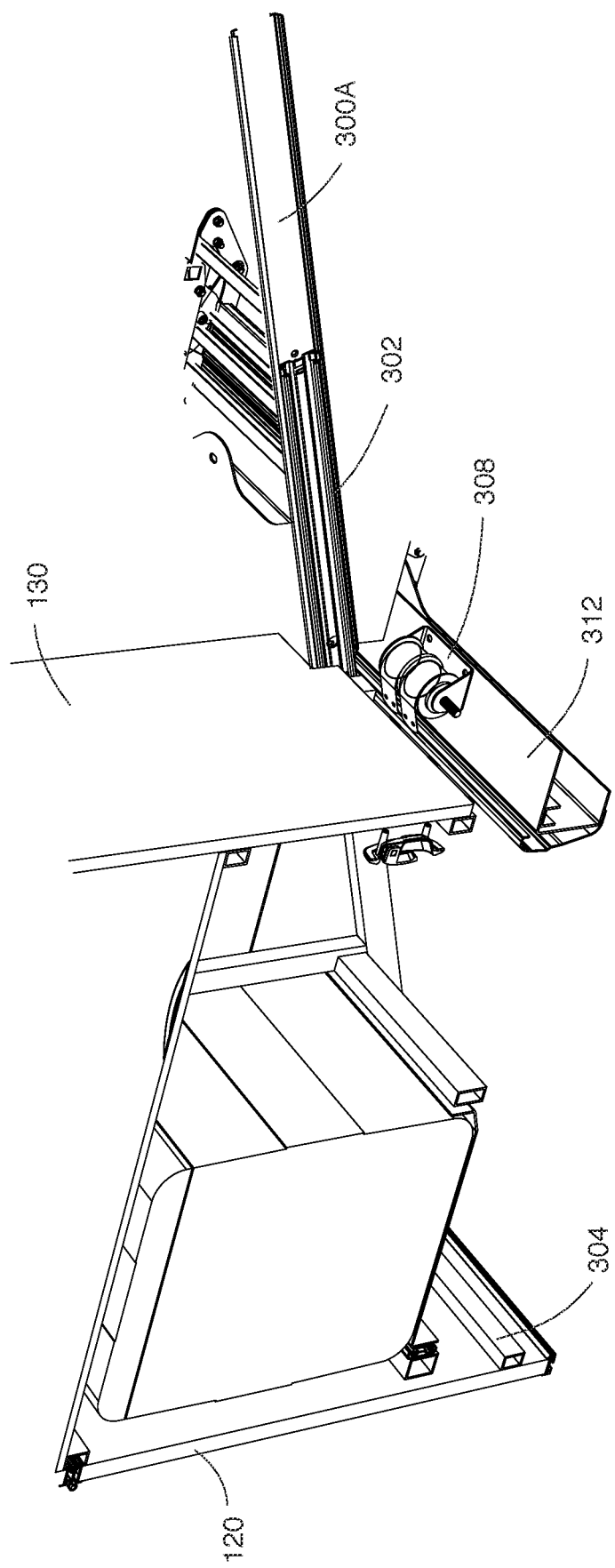
Figure 8A:
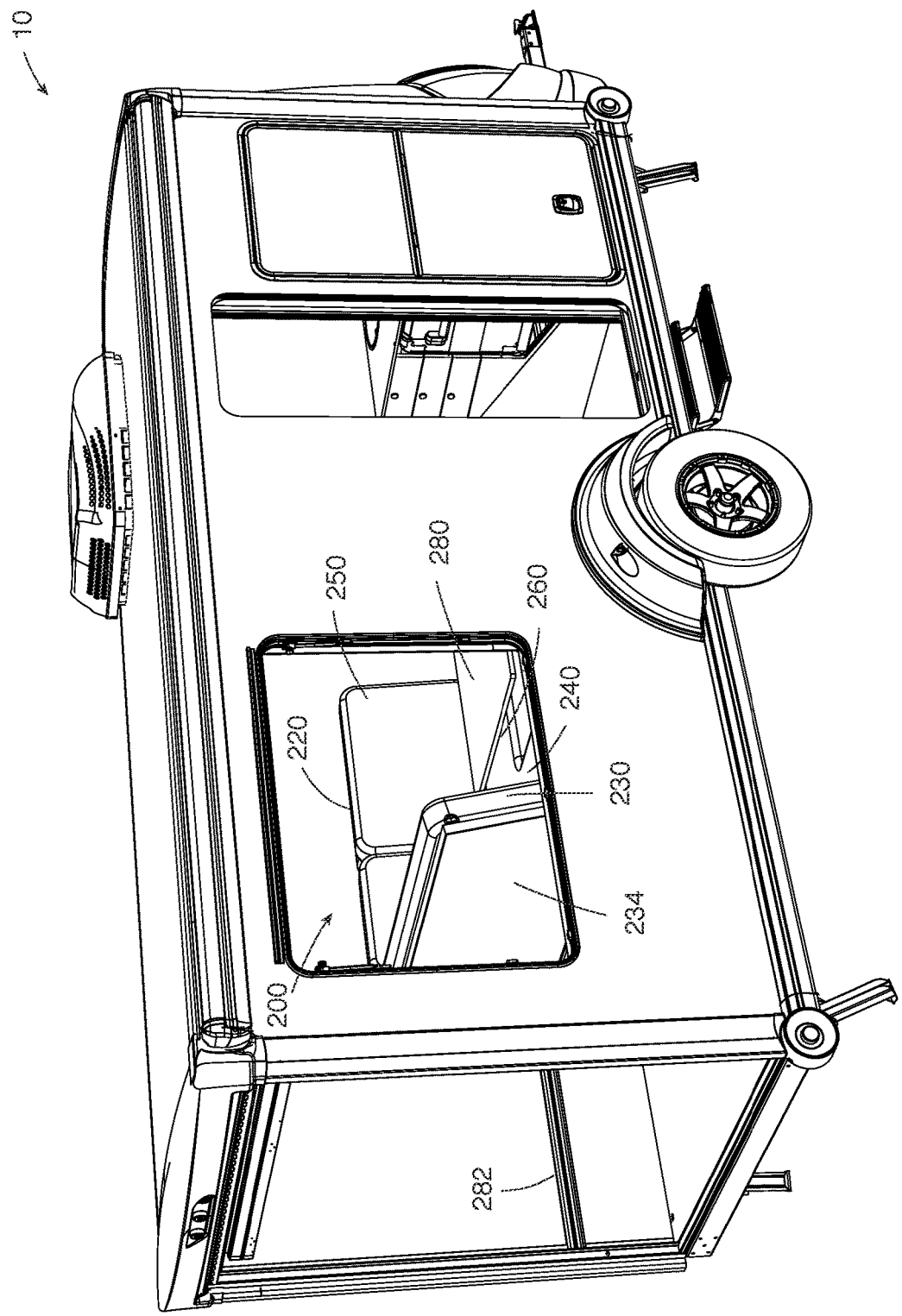
FIGS. 8A-8D show perspective views of various arrangements of an adjustable lounge system as part of a camper system.
Figure 8B:
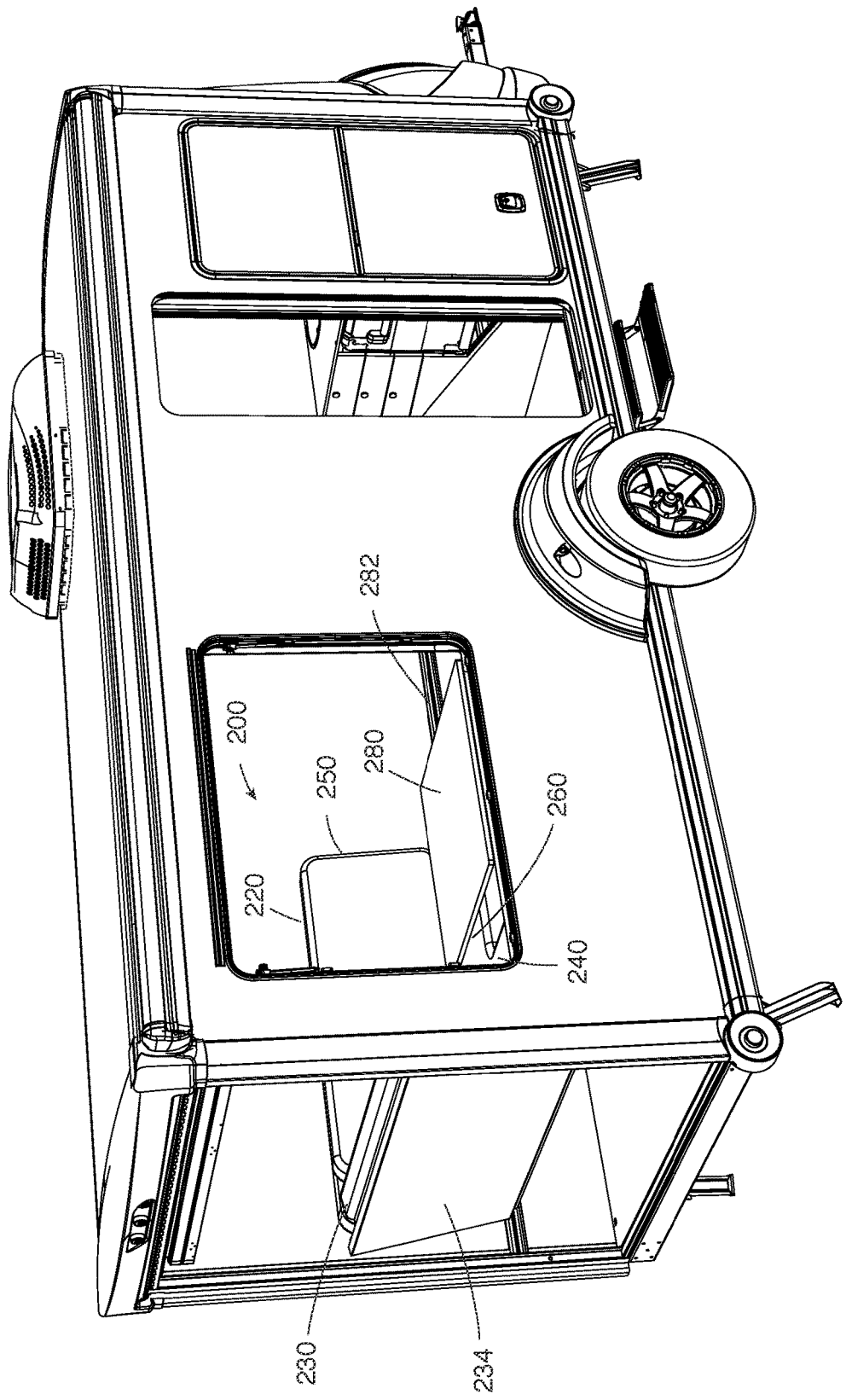
Figure 8C:
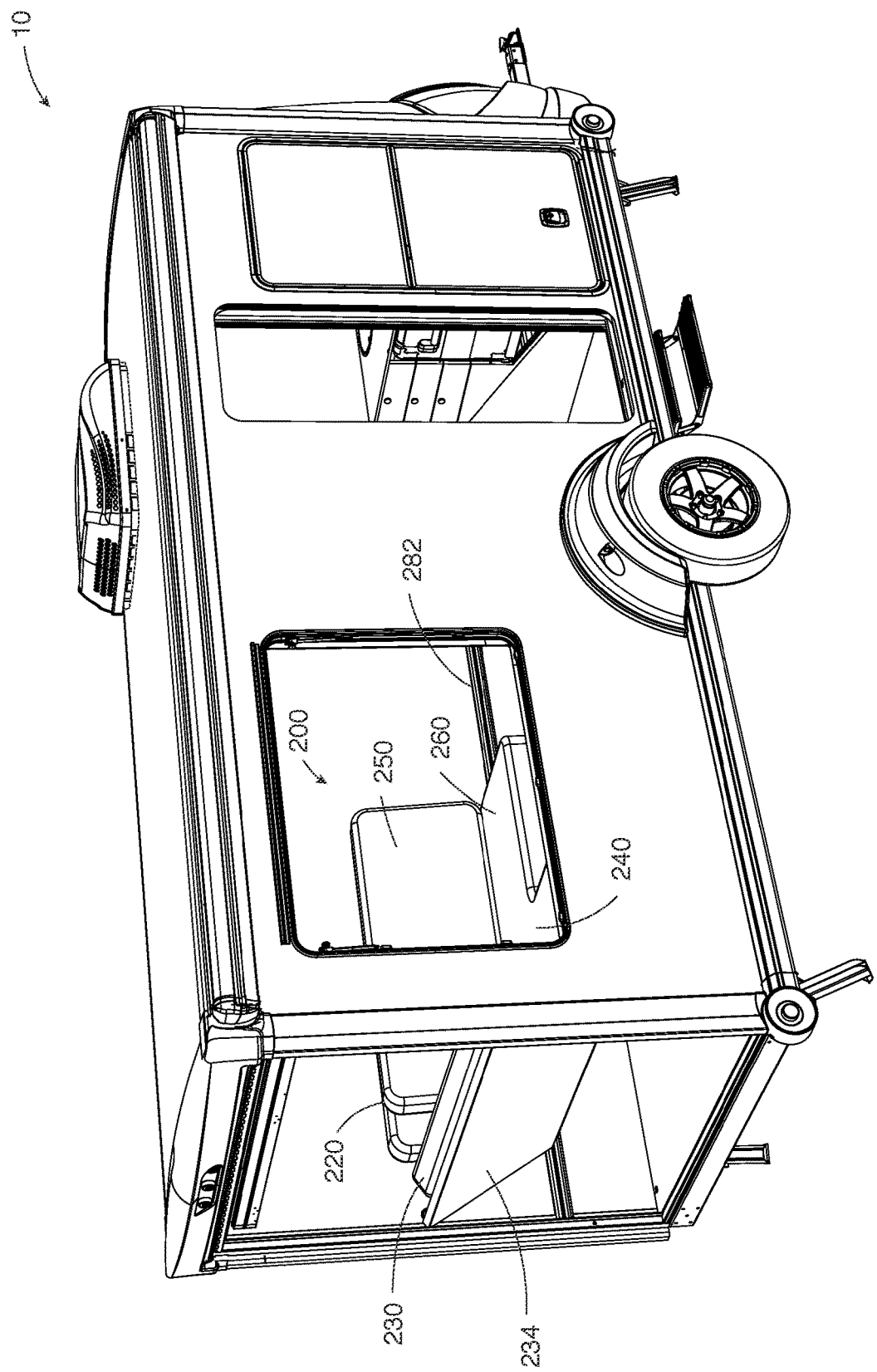
Figure 8D:
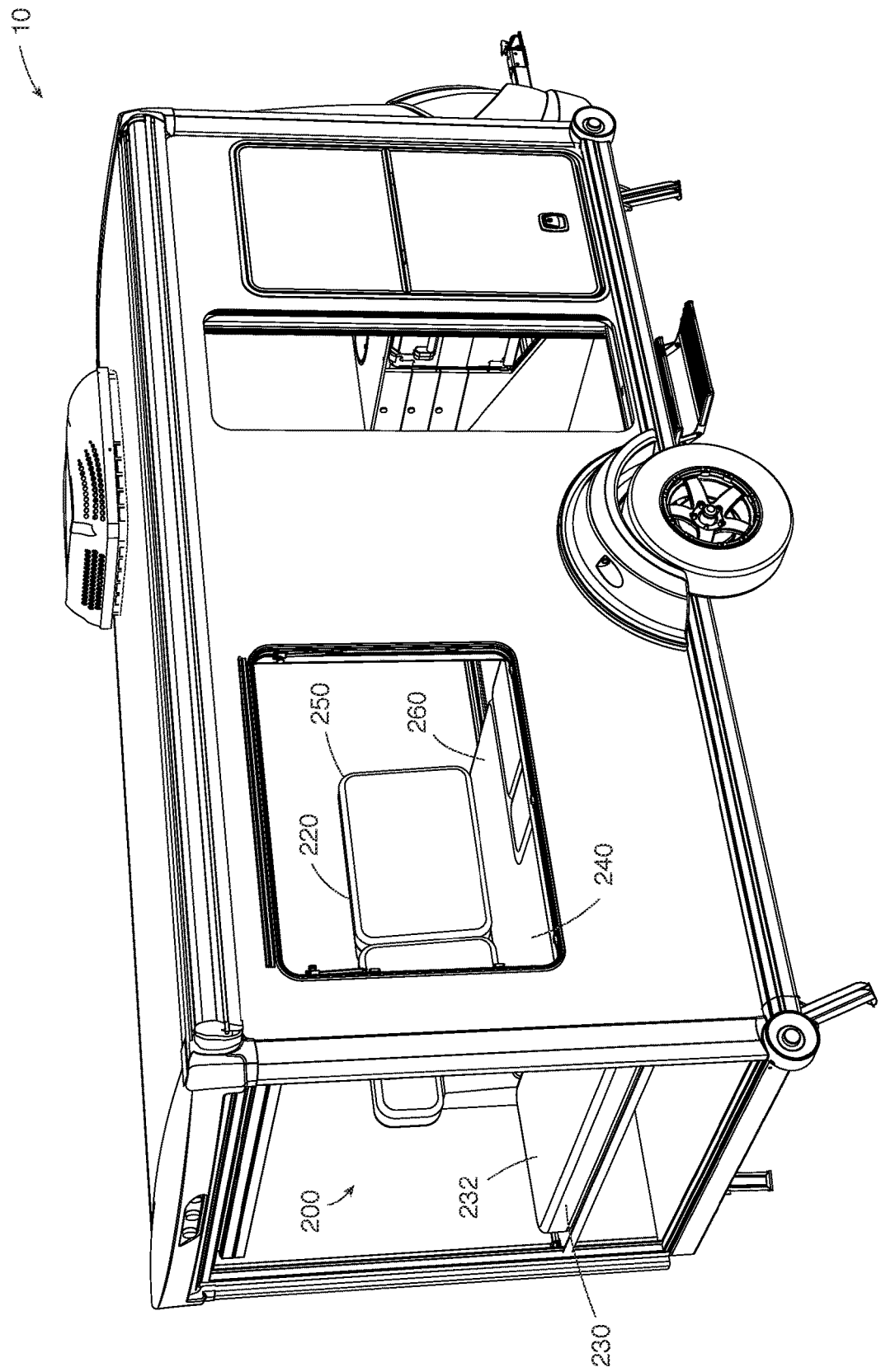

FIGS. 6, 7A, and 7B illustrate one embodiment wherein the movement mechanism 112 comprises a guide rail and slide system. As seen in FIG. 6, the guide rail and slide system may comprise a pair of rails 300A and 300B mounted onto a pair of panels 310A and 310B, respectively. The pair of rails 300A, 300B are mounted at an angle between about 15 degrees to 45 degrees to enable the kitchen system to slide downwardly from the retracted position to the deployed position. Each rail includes a drawer slide 302 enabling the kitchen system to slide along the rail 300. The frame 110 includes one or more attachment points 304 to attach the frame 110 to the guide and rail system. The attachment points 304 may be positioned at a lower end of the frame 110. For example, an attachment point 304 may be positioned on a bottom end of the front panel 120.

Turning to FIGS. 7A and 7B, the guide rail and slide system may further include a set of springs 306 to provide tension and balance the force of gravity on the kitchen system 100. One end of the spring 306 may be attached to the attachment point 304 and the other end of the spring may be mounted onto a spool 308. The spool 308 may be mounted onto the trailer frame 312.

As is shown in FIGS. 8A-8D, the translocatable lounge system 200 may have a lounge 220 and a table 280. The lounge 220 may be substantially similar to a sofa or chaise lounge. The lounge has a substantially vertical back 230 and a horizontal seat 240. The vertical back 230 may have a first surface 232 and a second surface 234. The first surface 232 may be configured to engage with or support a user.

The vertical back 230 may be hingedly connected to the seat and configured to move or translocate between a vertical position and horizontal position. In the horizontal position, the vertical back 230 may be on the same plane as the seat 240. The vertical back 230 may be at the same height as the seat 240, and may be flush with the seat 240. The vertical back 230 is further capable of being fixed in an intermediate reclined position. Alternatively, the vertical back 230 may be fixed at multiple intermediate reclined positions. The reclined position may be advantageous for users who wish to lounge.

The seat 240 may have a first free edge, and second edge proximate the vertical back 230. The seat 240 may have a width between three and a half feet and one and a half feet between the first edge and the second edge.

In some embodiments, the adjustable lounge system 200 is proximate a rear of the camper such that the vertical back 230 is closest to the rear of the camper, and the seat 240 may extend generally perpendicular from the vertical back 230 toward the front of the camper. In other words, a user seated on the seat 240 with the user's back touching the vertical back 230 would be facing toward the front of the camper. The second surface 234 may face the rear of the camper when the vertical back 230 is in a substantially vertical position.

In some embodiments, the lounge 220 may have a second substantially vertical back 250. The second substantially vertical back 250 may be proximate a lateral side of the camper. The second substantially vertical back 250 may be capable of some adjustment toward a horizontal position and various reclined positions, but may not be adjustable to fully horizontal. A second seat 260 may extend from a first edge proximate the vertical back to a second free edge. The second seat 260 may have a length from the first edge to the second edge that is between one and a half feet and three and a half feet. The second seat 260 may be substantially horizontal and extend from a first lateral side of the camper to a second lateral side of the camper. In some embodiments, the first and second seats 240, 260 are of unitary construction. Alternatively, the first and second seats 240, 260 may be proximate one another.

The table 280 may be substantially square-shaped. In some embodiments, the table 280 may be configured to extend partially outside a window. In alternative embodiments, the table may be configured to be utilized entirely within the camper.

The adjustable lounge system 200 may be further adjustable within the camper. The adjustable lounge system may be transitioned between the rear of the camper towards the front of the camper. In some embodiments, the adjustable lounge system 200 may be moved eight feet toward the front of the camper while retaining the full functionality of the living space. Thus, the lounge system 200 may be fully useable as a lounge regardless if it is adjusted toward the front of the camper or toward the rear of the camper. The extra room created at the rear of the camper may be advantageous as this could create extra storage within the camper.

In some embodiments, the lounge system 200 is coupled to rails or runners 282 in order to easily transition the lounge system 200 from a rear position to a forward position. Alternatively, the lounge system 200 may be transitioned by lifting the lounge 220 and table 280 and manually moving the lounge system 200 forward and backward within the camper.

Figure 9B:
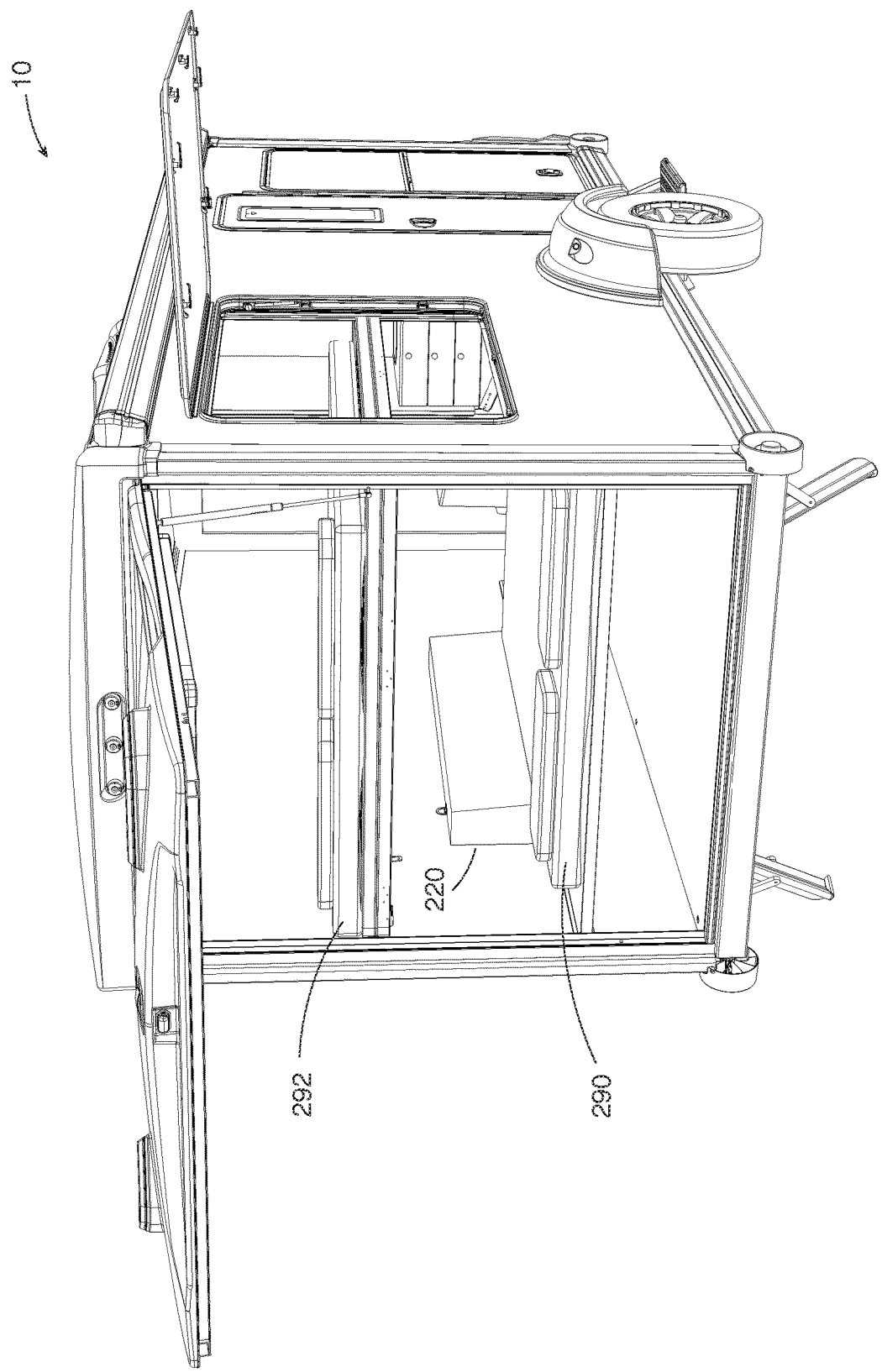
Figure 10A:
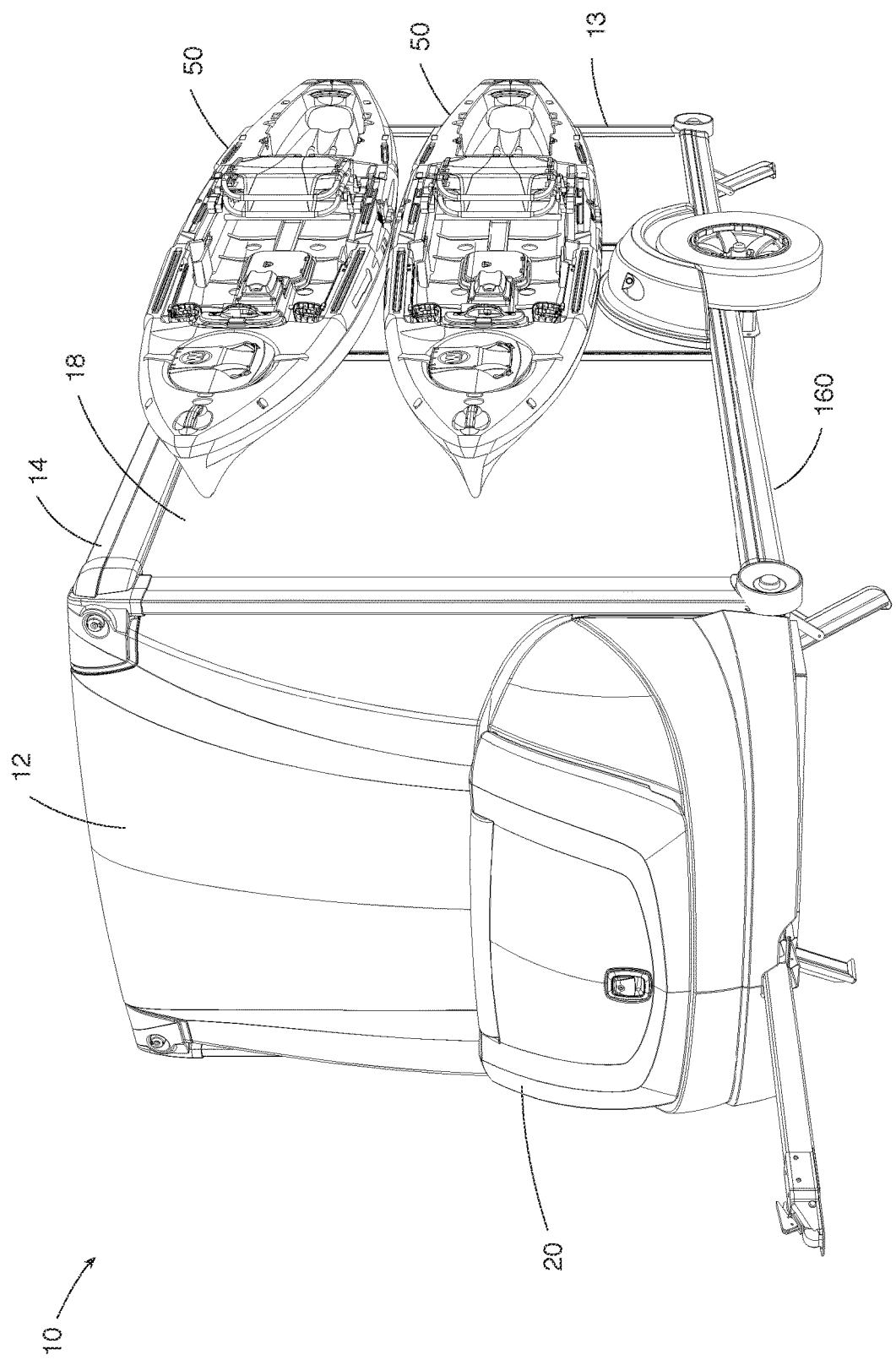
FIGS. 10A-10B show the camper and various storage aspects of the camper.
Figure 10B:
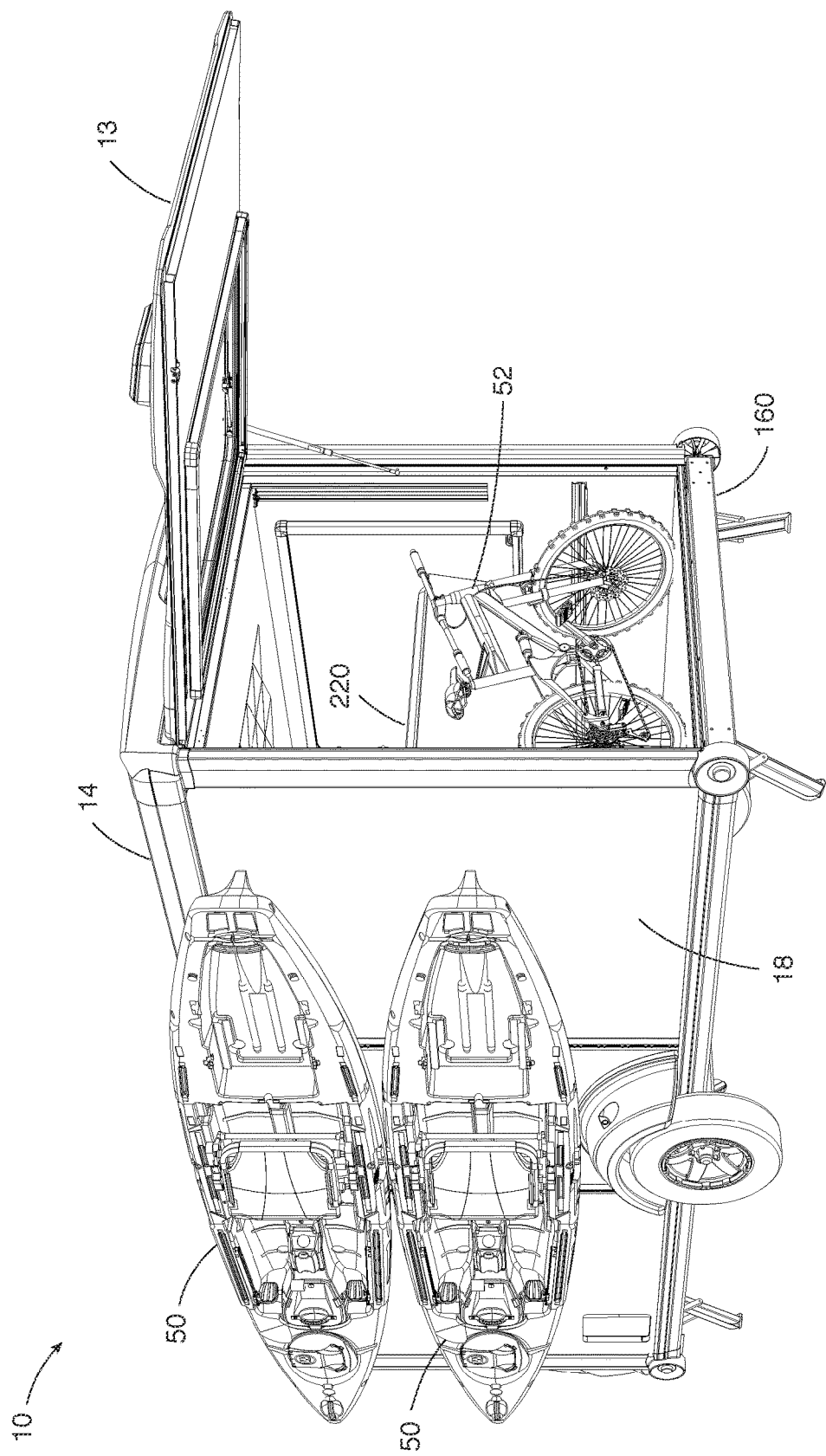

There may be a queen mattress 290 stored underneath the lounge 220 that can be raised and lowered, as is shown in FIGS. 9A and 9B. In some embodiments, the queen mattress 290 may fit atop the lounge 220. Alternatively, a queen mattress 290' may be created by reconfiguring the lounge 220 and lowering the vertical back 230 to a horizontal position that may be flush with the seat 240. In these embodiments, the seat 240 may extend from the horizontal back 230 for a distance greater than three and a half feet. Alternatively, an ottoman may be used to extend the length of the transitional bed. In other embodiments, a second queen mattress 292 may additionally be configured to be stored substantially or completely in contact with the first queen mattress 290', forming the ceiling of the camper when stored in the "ceiling position." The second queen mattress 292 can be lowered from the ceiling position to a sleeping position.

The camper may have an outer surface defined by a front 12, a back 13, a top 14, a bottom 15, and two lateral sides 18. As shown in FIGS. 10A-10B and FIGS. 11A-11C, the camper 10 may have additional storage capabilities. In some embodiments, the camper 10 is configured to carry kayaks 50. For example, the camper 10 may be configured to carry one or more kayaks on a lateral side 18. Furthermore, the adjustable lounge system 200 may be in a forward position to store additional cargo such as a bike 52.

Figure 11A:
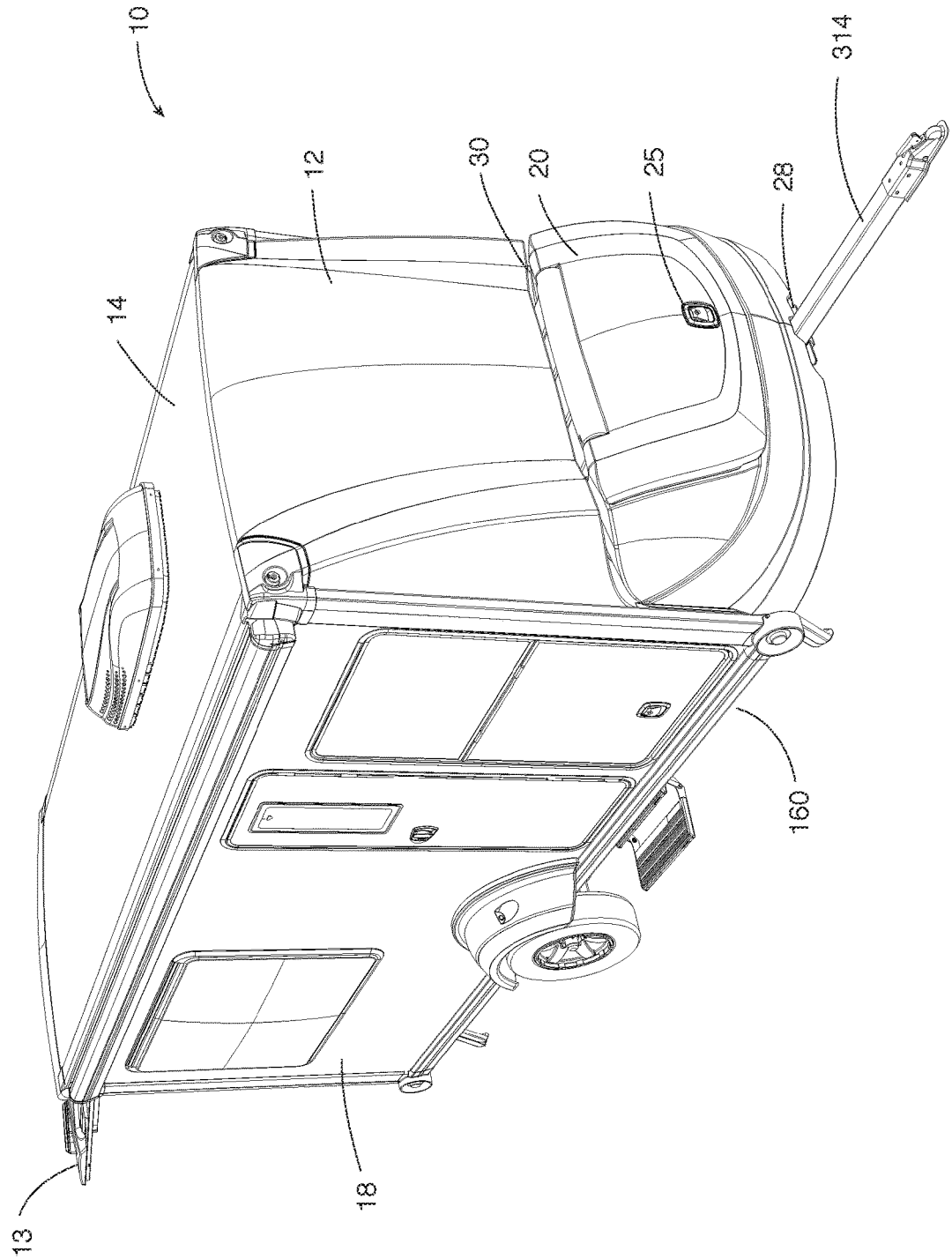
FIGS. 11A-11C are perspective views showing a storage pod of the camper.
Figure 11B:
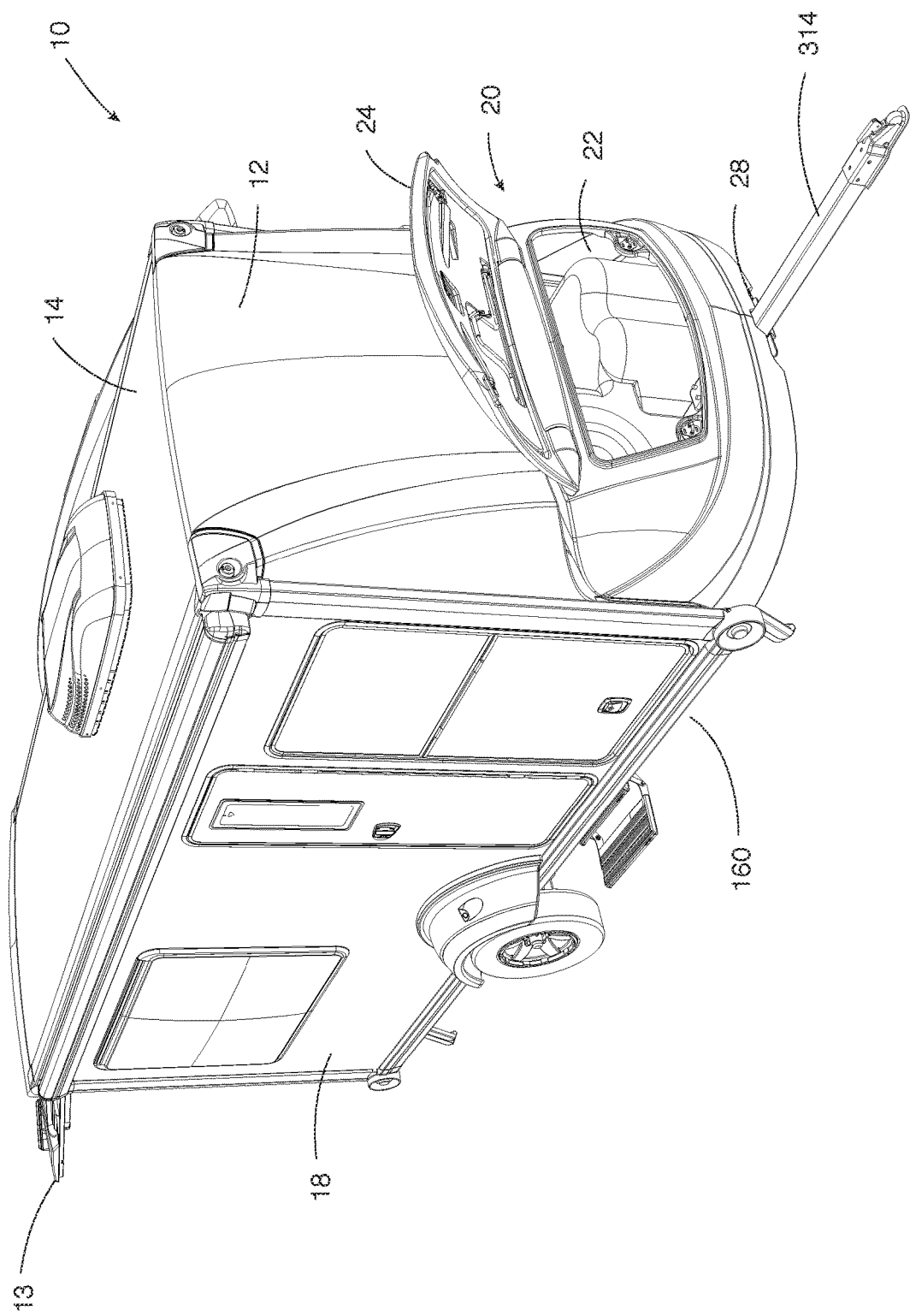
Figure 11C:
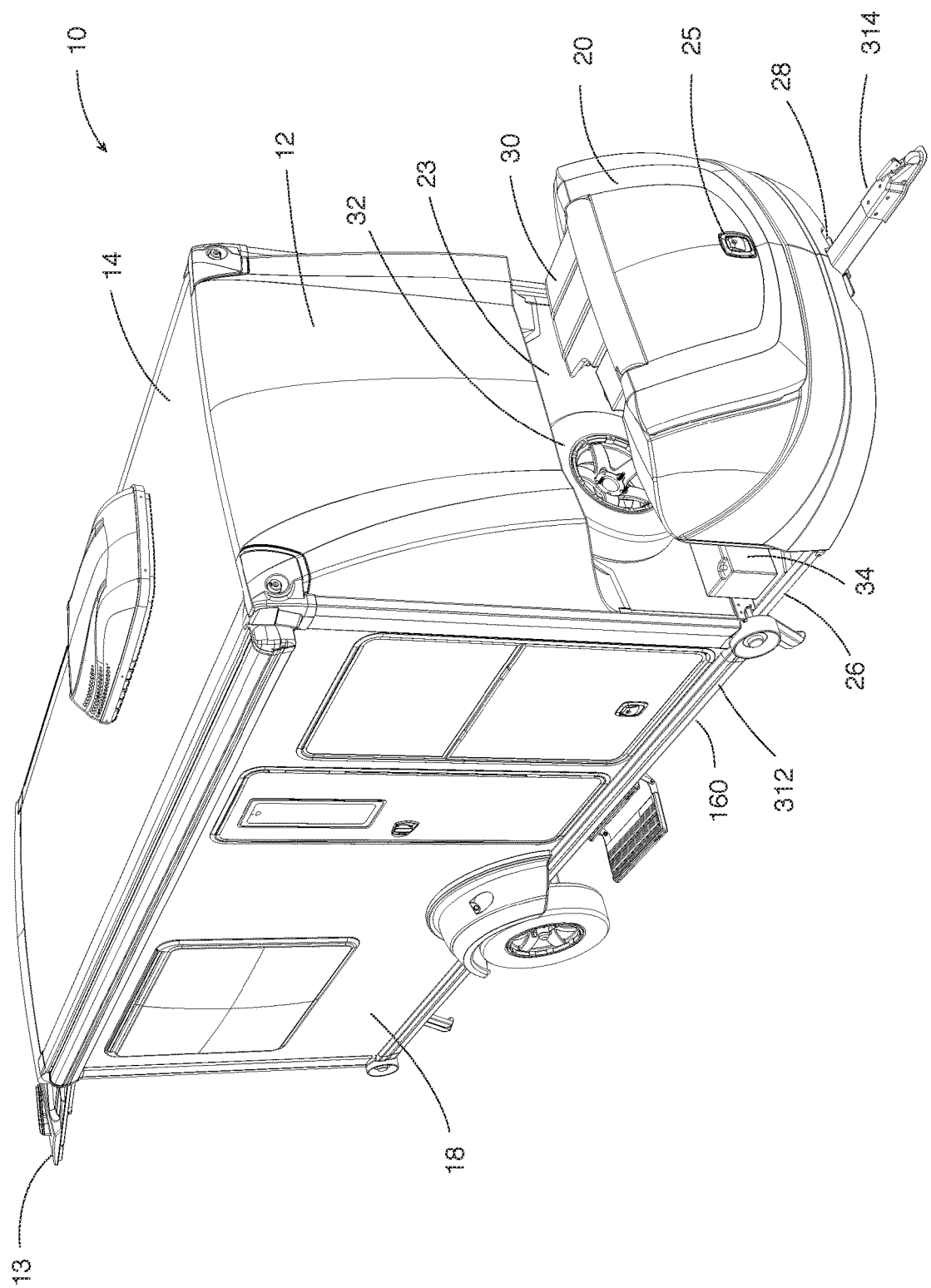

As seen in the embodiment shown in FIGS. 11A-11C, the camper 10 may be configured to have an exterior storage pod 20. The storage pod 20 has a storage space 22 and may be accessed by opening a hood 24. The hood 24 may be operated by a latch that may further include a lock 25 preventing unauthorized access to the storage space 22.

In the embodiment shown, the exterior storage pod 20 is positioned at the front of the camper 10. The storage pod 20 may form part of the nose of the camper 10 and may be attached to the trailer frame 312 via a rail 26. Additional storage space 23 may be accessed by detaching the storage pod 20 from the trailer frame 312. For example, the storage pod 20 may be detached from the front 12 of the camper 10 using rails 26 attached to the trailer frame 312. In one embodiment, the storage pod 20 may have telescoping guide rails 26 that attach to the trailer frame 312 that enable the storage pod 20 to detach and slide away from the front 12 of the camper 10. The storage pod 20 may further include a slot 28 for guiding the storage pod 20 along the center post 314 of the trailer frame 312. The storage pod 20 may be attached to the camper 10 by inserting a tab 30 on the storage pod 20 into a slot at the front of the camper (not shown). The additional storage space 23 may be used to store items such as a spare tire 32, one or more batteries 34, and propane gas tanks. In one embodiment, the storage pod 20 may further include a lock to prevent unauthorized access. For example, the storage pod latch bracket may include a hole in the sheet metal component to allow a common long-shackle padlock to be inserted. Installing the padlock prevents the storage box latch from being disengaged to allow movement.

The present approach may be embodied in other specific forms without departing from the spirit or essential characteristics thereof. The disclosed embodiments are therefore to be considered in all respects as illustrative and not restrictive, the scope of the present approach being indicated by the claims of the application rather than by the foregoing description, and all changes which come within the meaning and range of equivalency of the claims are therefore intended to be embraced therein. One of ordinary skill in the art should appreciate that numerous possibilities are available, and that the scope of the present approach is not limited by the embodiments described herein.

What is claimed is:

1. A work area comprising a substantially horizontal work surface that can be translocated between a first location and a second location;
   wherein the work area comprises one or more tracks along which the work area can be moved between the first and the second location and the work surface remains slidably connected and substantially horizontal during translocation between the first location and the second location;
   the work area comprises a frame wherein at least a portion of the frame contacts and is affixed to the work surface;
   the one or more tracks are connected to lateral sides of the frame;
   the one or more tracks are pairs of guide rails and slides, and wherein one of each pair of guide rails and slides is fixed to the frame affixed to the work surface, and the other of each pair of guide rails and slides is slidably moveable relative to the guide rail or slide fixed to the frame;
   the first location comprises a floor above which the work surface is situated when the work area is located in the first location and the second location comprises a base above which the work surface is situated when it is in the second location;
   wherein the floor and the base are not level with each other; and
   wherein when the work surface is located in the first location, its height above the floor is substantially the same as its height above the base when it is in the second location.

2. The work area of claim 1, wherein the one or more guide rails are angled downward from the first location to the second location at an incline of about 15 to 45 degrees from the work surface.

3. The work area of claim 1, further including one or more constant force springs and/or a motorized drive to assist with movement between the first and second location.

4. The work area of claim 1, wherein the height above the floor and the height above the base is between about 5 inches to 42 inches.

5. The work area of claim 1, wherein the work area comprises one or more of types of equipment selected from the group consisting of: a cash register, a vending machine, a point of sale equipment, an automatic teller equipment, a medical equipment, a dental equipment, a veterinary equipment, a pet grooming equipment, a food preparation or handling equipment and a lock smith equipment; any one or more of which are optionally secured, directly or indirectly to the work surface.

6. A portable unit in combination with the work area according to claim 1, wherein the one or more tracks are affixed at an angle relative to the work surface such that the work area is slidably moveable along the one or more tracks relative to the portable unit.

7. The portable unit of claim 6, wherein the first location is within the portable unit, the second location is fully or partially on an exterior of the portable unit, and wherein the base is the surface upon which the portable unit is located.

8. The portable unit of claim 6, wherein the portable unit is a recreational vehicle, a camper, or a trailer further comprising sleeping quarters and whereby the work area serves as a kitchen.

9. The portable unit of claim 8, wherein the work surface is a counter.

10. The portable unit of claim 9, wherein the work area comprises one or more, or each of: a sink disposed in the counter, a refrigerator located on or below the counter, a stove located on or disposed in the counter, an oven located on or below the counter, and a storage cabinet above or below the counter.

11. The portable unit of claim 6, wherein the portable unit is selected from a truck camper, a camping trailer, and a fifth wheel camping trailer.

12. The portable unit of claim 7, wherein the second location is located on a lateral side of the portable unit.

13. The portable unit of claim 7, wherein the second location is located on a rear or a front of the portable unit.

* * * * *